US009962054B2

United States Patent
Seo et al.

(10) Patent No.: US 9,962,054 B2
(45) Date of Patent: May 8, 2018

(54) ROBOT CLEANER, ROBOT CLEANING SYSTEM HAVING THE SAME, AND METHOD FOR OPERATING A ROBOT CLEANER

(71) Applicant: LG ELECTRONICS INC., Seoul (KR)

(72) Inventors: Daegeun Seo, Seoul (KR); Juwan Lee, Seoul (KR); Lagyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 62 days.

(21) Appl. No.: 15/077,684

(22) Filed: Mar. 22, 2016

(65) Prior Publication Data

US 2016/0278599 A1    Sep. 29, 2016

(30) Foreign Application Priority Data

Mar. 23, 2015 (KR) ........................ 10-2015-0040090

(51) Int. Cl.
| | | |
|---|---|---|
| *A47L 11/40* | (2006.01) | |
| *G05D 1/02* | (2006.01) | |
| *G05D 1/00* | (2006.01) | |
| *A47L 9/28* | (2006.01) | |
| *G08C 17/02* | (2006.01) | |
| *H04Q 9/00* | (2006.01) | |

(52) U.S. Cl.
CPC ......... *A47L 11/4011* (2013.01); *A47L 9/2826* (2013.01); *A47L 9/2857* (2013.01);
(Continued)

(58) Field of Classification Search
CPC .......... A47L 11/4011; A47L 11/4066; A47L 9/2857; A47L 9/2894; A47L 9/2826;
(Continued)

(56) References Cited

U.S. PATENT DOCUMENTS

2012/0316680 A1* 12/2012 Olivier, III ........... G05D 1/0246
700/258
2013/0338831 A1* 12/2013 Noh ....................... B25J 9/1676
700/259

(Continued)

FOREIGN PATENT DOCUMENTS

EP    2 508 957 A2    10/2012
EP    2 511 782 A2    10/2012

*Primary Examiner* — Frederick M Brushaber
(74) *Attorney, Agent, or Firm* — Dentons US LLP

(57) ABSTRACT

Disclosed herein are a robot cleaner and a robot cleaning system having the same. The robot cleaner includes a main body, a traveling unit configured to move the main body, a cleaning unit configured to execute cleaning, a camera configured to capture an image including foreign substances, a communication unit configured to exchange data with a mobile terminal or a server, and a controller configured to control transmission of the image including the foreign substances and image related information to the mobile terminal or the server and to execute cleaning of an area around the foreign substances based on cleaning execution information regarding the foreign substances or to execute no cleaning of the area around the foreign substances based on cleaning avoidance information regarding the foreign substances, transmitted from the mobile terminal or the server. Thereby, the robot cleaner may selectively clean foreign substances.

17 Claims, 24 Drawing Sheets

(52) U.S. Cl.
CPC ......... *A47L 9/2894* (2013.01); *A47L 11/4066* (2013.01); *G05D 1/0022* (2013.01); *G05D 1/0246* (2013.01); *G08C 17/02* (2013.01); *H04Q 9/00* (2013.01); *A47L 2201/06* (2013.01); *G05D 2201/0203* (2013.01); *G08C 2201/30* (2013.01); *G08C 2201/51* (2013.01)

(58) Field of Classification Search
CPC . A47L 2201/06; G08C 17/02; G08C 2201/30; G08C 2201/51; H04Q 9/00; G05D 2201/0203; G05D 1/0246; G05D 1/0022
See application file for complete search history.

(56) References Cited

U.S. PATENT DOCUMENTS

| | | | |
|---|---|---|---|
| 2014/0032033 A1* | 1/2014 | Einecke | A01D 34/008 701/24 |
| 2014/0207280 A1 | 7/2014 | Duffley et al. | |
| 2014/0304937 A1* | 10/2014 | Kim | A47L 9/28 15/319 |
| 2015/0157182 A1* | 6/2015 | Noh | G05D 1/0231 701/28 |
| 2015/0197012 A1* | 7/2015 | Schnittman | G05D 1/0227 700/250 |
| 2015/0362921 A1* | 12/2015 | Hanaoka | G01L 11/24 701/23 |
| 2016/0059418 A1* | 3/2016 | Nakamura | G05D 1/0246 700/253 |
| 2016/0144505 A1* | 5/2016 | Fong | B25J 9/1602 700/250 |
| 2016/0147230 A1* | 5/2016 | Munich | G05D 1/0246 701/28 |
| 2016/0167226 A1* | 6/2016 | Schnittman | B25J 5/00 382/153 |
| 2016/0278599 A1* | 9/2016 | Seo | A47L 9/2826 |
| 2016/0313741 A1* | 10/2016 | Lindhe | G05D 1/0248 |

* cited by examiner

FIG. 1
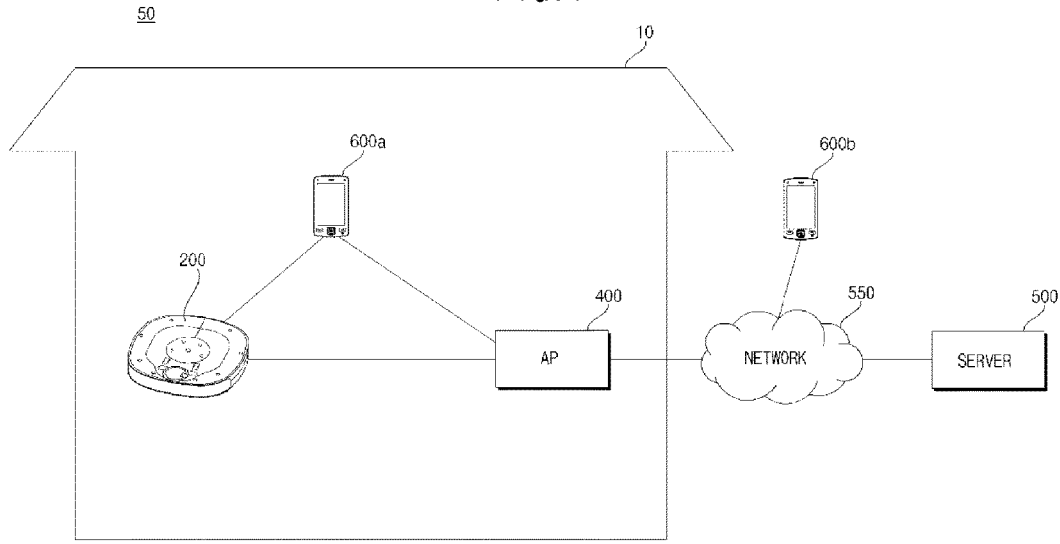
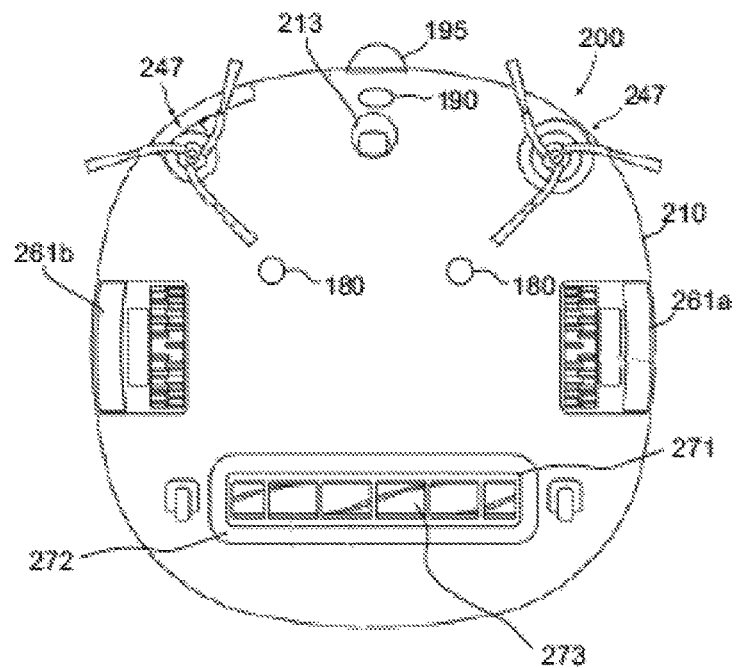
Fig. 2a

ROBOT CLEANER, ROBOT CLEANING SYSTEM HAVING THE SAME, AND METHOD FOR OPERATING A ROBOT CLEANER

CROSS-REFERENCE TO RELATED APPLICATION

This application claims the benefit of Korean Patent Application No. 10-2015-0040090, filed on Mar. 23, 2015, in the Korean Intellectual Property Office, the disclosure of which is incorporated herein by reference.

BACKGROUND OF THE INVENTION

1. Field of the Invention

The present disclosure relates to a robot cleaner, which is also known as an automatic cleaner, and to a method for operating the robot cleaner. In particular, the present disclosure relates to a robot cleaner which may execute selective cleaning of foreign substances. The present disclosure further relates to a robot cleaning system having the same.

2. Description of the Related Art

In general, cleaners are home appliances which remove foreign substances from the floor by suction. A cleaner which autonomously executes cleaning is referred to as a robot cleaner. Such a robot cleaner typically removes foreign substances from the floor by suction while traveling using driving force of a motor operated by a rechargeable battery.

For example, robot cleaners facilitate the cleaning of a room by automatically cleaning a floor of the room without any interaction of the user. The robot cleaner moves by a driving force of a motor operated by a battery to suction and remove a foreign substance from a floor surface.

Generally, the robot cleaner includes a travelling device which is installed on a main body. The main body forms the outer appearance of the robot cleaner. The travelling device is configured to move the robot cleaner in a predetermined direction through the room to allow the robot cleaner to suction a foreign substance from a floor surface. The robot cleaner includes at least one suction port which is disposed on the bottom of the main body to suction any foreign substance from the floor. Additionally, the robot cleaner typically includes a main brush, which rotates and directly contacts the floor to transport the foreign substance to the suction port.

A robot cleaner may further include a side brush assembly for corner-cleaning. The side brush may be adapted for predetermined cleaning operations. The side brush assembly makes it possible to transport and/or move a foreign substance which is not located under the main body to the suction port. This increases the cleaning area without fully covering the area with the main body of the robot cleaner. The side-brush assembly may rotate relative to the main body to move foreign substance located at the outside of the main body toward the suction port.

However, because robot cleaners often operate when the user is not present, there might be situations in which automatic cleaning is not desired. For example, automatic cleaning may be undesirable when the cleaner moves in a children's room and detects a small toy. Another situation in which automatic cleaning should be avoided, is, when a pet's excrement or foreign material (e.g., pee and poop) is on the floor. Indeed, automatic cleaning may only worsen the cleaning state by smearing or distributing the excrements throughout the room.

SUMMARY OF THE INVENTION

An object of the present disclosure is to provide a robot cleaner which may execute selective cleaning of foreign substances and a robot cleaning system having the same.

A further object of the present disclosure is to provide a robot cleaner and a method for operating the robot cleaner allowing an improved cleaning process avoiding any undesired cleaning operation and preferably providing a possibility for an interaction with the user even if the user has left the apartment or could not manually control the robot cleaner.

According to an embodiment of the disclosure, a robot cleaner includes a main body, a traveling unit that moves the main body, a cleaning unit that executes a cleaning operation, a camera that captures an image of a foreign substance, a communication unit that exchanges data with a mobile terminal or a server, and a controller that controls transmission of the image and image related information to the mobile terminal or the server, and controls execution of the cleaning operation based on a cleaning instruction received from the mobile terminal or the server, wherein, when the cleaning instruction comprises cleaning execution information, the controller controls the cleaning unit to clean an area where the foreign substance is located, and when the cleaning instruction comprises cleaning avoidance information, the controller controls the cleaning unit to not clean the area where the foreign substance is located.

According to another embodiment of the disclosure, a robot cleaner includes a main body, a traveling unit that moves the main body, a cleaning unit that executes a cleaning operation, a stereo camera that captures an image of a foreign substance, a communication unit that exchanges data with a communication module, and a controller that executes signal processing of the image received from the camera, verifies an object related to the foreign substance within the image based on the signal-processing, and generates cleaning instructions regarding the foreign substance based on the verified object related to the foreign substance, wherein, when the cleaning instruction comprises cleaning execution information, the controller controls the cleaning unit to clean an area where the foreign substance is located, and when the cleaning instruction comprises cleaning avoidance information, the controller controls the cleaning unit to not clean an area where the foreign substance is located.

According to yet another embodiment of the disclosure, a robot cleaning system includes a robot cleaner that captures an image including a foreign substance, transmits the image including the foreign substances and image related information to a mobile terminal or a server, and executes a cleaning operation related to the foreign substance based on cleaning instructions received from the mobile terminal or the server, and a mobile terminal that displays an image received from the robot cleaner and transmits the cleaning instructions to the robot cleaner based on the displayed image, wherein the robot cleaner cleans an area where the foreign substance is located when the cleaning instructions comprise cleaning execution information, and the robot cleaner does not clean the area where the foreign substance is located when the cleaning instructions comprise cleaning avoidance information.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a robot cleaning system in accordance with an embodiment of the present disclosure;

FIG. 2(a) is a bottom view of a robot cleaner according to a first embodiment of the disclosure;

DETAILED DESCRIPTION OF THE EMBODIMENTS

Figure 2B:
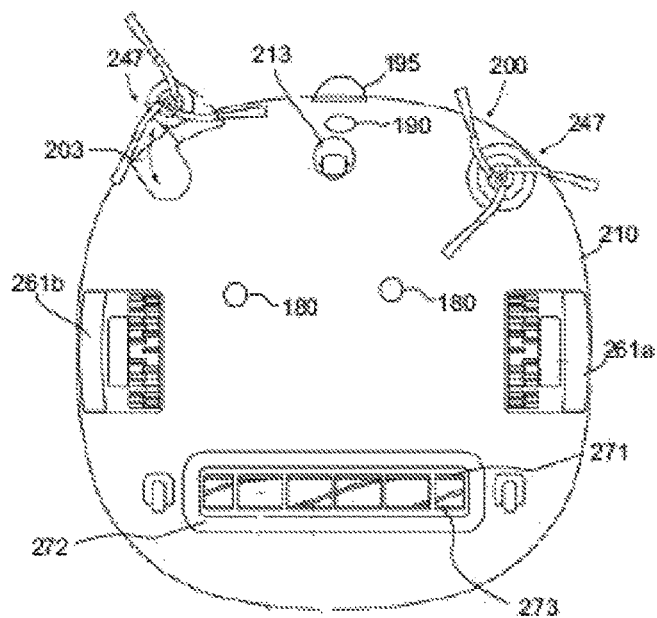
FIG. 2(b) is a bottom view of a robot cleaner according to an embodiment of the disclosure.

Advantages, features, and methods for achieving those of embodiments may become apparent upon referring to embodiments described later in detail together with the attached drawings. However, embodiments are not limited to the embodiments disclosed hereinafter, but may be embodied in different modes. The same reference numbers may refer to the same elements throughout the specification.

FIG. 1 is a view illustrating a configuration of a robot cleaning system in accordance with an embodiment of the present disclosure. With reference to FIG. 1, a robot cleaning system 50 in accordance may include at least a robot cleaner 200 and a mobile device 600a or 600b. Preferably, the robot cleaning system 50 further includes an AP (Access Point) device 400, a server 500 and a network 550.

The robot cleaner 200, the AP device 400, and the mobile terminals 600a and 600b may be provided within a building 10, such as a home. The robot cleaner 200, which autonomously executes cleaning, may execute automatic traveling and automatic cleaning.

The robot cleaner 200, in addition to the traveling function and the cleaning function, may include a communication unit (not shown) and exchange data with electronic devices within an internal network 10 or electronic devices connectable to the robot cleaner 200 through the external network 550. The communication unit may execute data exchange with the AP device 400. The communication unit may be wired or wirelessly connected to the AP device 400.

The AP device 400 may provide the internal network 10 to an adjacent electronic device. For example, the AP device 400 may provide a wireless network. Further, the AP device 400 may allocate wireless channels of a designated communication method to electronic devices within the internal network 10 and execute wireless data communication through the corresponding channels. For example, the designated communication method may be a Wi-Fi communication.

The mobile terminal 600a located within the internal network 10 may be connected to the robot cleaner 200 through the AP device and execute monitoring and remote control of the robot cleaner 200. The AP device 400 may execute data communication with an external electronic device through the external network 550 in addition to the internal network 10.

For example, the AP device 400 may execute wireless data communication with the mobile terminal 600b through the external network 550. In particular, the mobile terminal 600b located in the external network 550 may execute monitoring and remote control of the robot cleaner 200 by being connected to the robot cleaner 200 through the external network 550 and the AP device 400.

As another example, the AP device 400 may execute wireless data communication with the server 500 through the external network 550. The server 500 may include a voice recognition algorithm. Further, when the server 500 receives voice data, the server 500 may convert the received voice data into text data and then output the text data.

The server 500 may store firmware information, driving information (e.g., course information, etc.) of the robot cleaner 200, and register product information of the robot cleaner 200. For example, the server 500 may be operated by a manufacturer of the robot cleaner 200. As another example, the server 500 may be operated by an open application store operator.

The server 500 may be a home server, which is provided in a home, to store state information of home appliances within the home or to store contents shared by the home appliances within the home. Such home server 500 may store information related to foreign substances, for example, foreign substance images.

In accordance with an embodiment of the present disclosure, the robot cleaner 200 may capture an image that includes a foreign substance through a camera provided in the robot cleaner 200, transmit the image including the foreign substances and image related information to the mobile terminal 600 or the server 500, and clean areas around the foreign substances in accordance with a positive cleaning command information regarding the foreign substances from the mobile terminal 600 or the server 500. Alternatively, the robot cleaner 200 may not clean areas around the foreign substances in accordance with a negative cleaning command regarding the foreign substances. Thereby, the robot cleaner 200 may selectively clean the foreign substances. Thus, by not executing cleaning of certain foreign substances, such as a pet's excrement, further contamination of an area proximate the excrement due to the cleaning mode of the robot cleaner 200 may be prevented.

In accordance with another embodiment of the present disclosure, the robot cleaner 200 may capture an image that includes a foreign substance through a stereo camera provided within the robot cleaner 200, verify and/or evaluate an object related to the foreign substance in the image by executing signal-processing or pattern recognition of the captured image, generate by itself positive cleaning command information or negative cleaning command information regarding the foreign substances based on the verified object related to the foreign substances, and clean an area proximate the foreign substance based on the cleaning command information or not an clean area proximate the foreign substance based on the cleaning command information. Thereby, the robot cleaner 200 may selectively clean the foreign substance.

The above-described operation of the robot cleaner 200 or the operation of the robot cleaner 200 and the mobile terminal 600 will be described later in more detail with reference to the embodiment shown in FIG. 9.

Figure 2C:
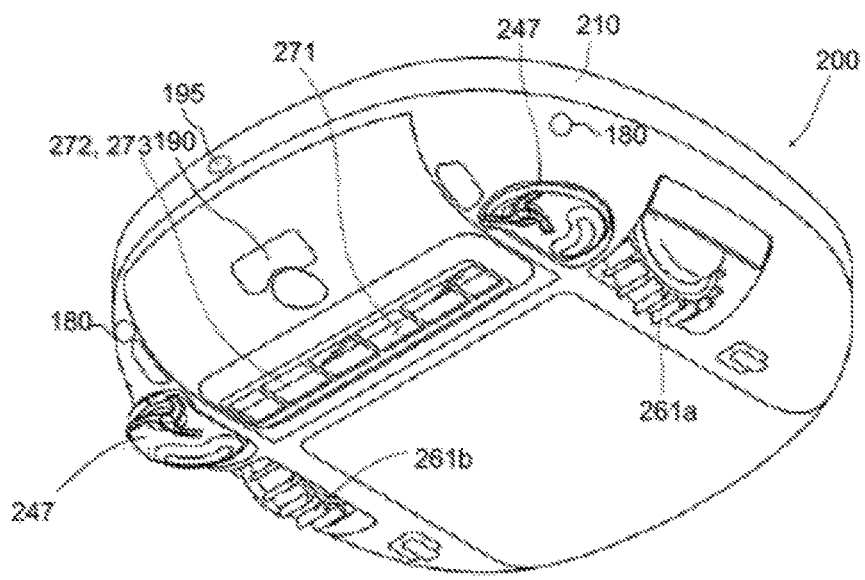
FIG. 2(c) is a perspective view illustrating the bottom of the robot cleaner according to the second embodiment of the disclosure.

The robot cleaner 200 as shown in FIGS. 2a, 2b, and 2c include a main body 210 forming the outer appearance of the cleaner 200 (hereinafter, "cleaner"). The main body 210 may have a flat polyhedral-like shape but is not limited thereto. The main body 210 accommodates components of the cleaner 200, such as, for example, the suction member, battery 199 (not shown), and a collecting member (not shown) for collecting the foreign substance after being suctioned.

The suction port 111 may be provided in a bottom portion of the main body 210. The suction port 111 may form an inlet through which a foreign substance is suctioned into the main body 210. For example, the collecting member may accommodate the foreign substance being introduced through the suction port 271. The collecting member may be exchangeable or removable from the robot cleaner 200 so that it can be emptied or cleaned.

The suction port 271 may be a cut-out in the bottom portion of the main body 210.

The one or more side brush assemblies 247 may have a plurality of single brushes. The single brushes may rotate independently from the main brush 273. The side brush assembly 247 may be accommodated by a seating recess 203 provided in the bottom portion of the main body 210. The seating recess 203 may be formed by upwardly recessing a portion of the bottom of the main body 210 from the rest thereof.

As shown in FIGS. 2a, 2b, and 2c, two seating recesses 203 may be provided at both sides of the cases. It is understood that the number of the seating recesses is not limited thereto. For example, seating recesses may be provided at four corners of the robot cleaner for being able to move forward and backward and use simultaneously the side-brush assembly 247.

A main brush 273 may be provided at the bottom side of the main body 210 in an area corresponding to the suction port 271. The main brush 273 may extend in the suction port 271 to contact the floor and thereby contact a foreign substance and to remove the foreign substance from the floor by transferring it to the suction port 271 to be introduced into the suction port 271.

The suction force may be generated by a suction fan 272. The main brush 273 may be exposed downwardly through the suction port 271 and may be rotatable. The main brush 273 may be driven by a driving member (not shown) that provides a driving force to rotate the main brush 273.

The main body 210 may further include at least one travelling device 280. The travelling device 280 may include a driving motor (not shown), which may be provided inside the main body 210. The travelling device 280 may include at least one driven wheel 261a which is rotated by the driving motor. Preferably, for example, there are two driven wheels 261a, 261b located at opposite sides of the bottom side of the main body 210 (e.g., right and left sides) to move the robot cleaner in a desired direction.

Further, there may be passive wheel(s) 213 to support the main body 210 as well as keep the main body 210 rotatable and in a horizontal alignment.

The side-brush assemblies 247 may be movably installed on the main body 210. For example, side-brush assemblies 247 may be rotated to be selectively located at the lower side or the outside of the main body 210.

The side-brush assemblies 247 may be configured such that the suction member suctions a foreign substance located outside of the suction port 271 through the suction port 271. The side-brush assembly 247 may include a movable member and a brush having single brushes which are separated from each other. The movable member of the side-brush assembly may rotate about an axis. However, it might also perform a rectilinear movement just out of the seating recess 203 of the main body 210.

The robot cleaner 200 may include a plurality of sensors 180 provided at various locations at the bottom side or side surfaces of the main body 210. It is understood that the location of the sensors 180 is not limited thereto. The sensors 180 may include, for example, a camera, an optical sensor, a humidity sensor, a metal sensor, a smell sensor, and/or gas sensor.

For example, the robot cleaner 200 may include an optical sensor, a humidity sensor, a metal sensor, and a smell sensor to detect different characteristics or parameters to have an efficient sensing behavior. Thus, the cleaner is able to detect humidity as such as an indication for a critical foreign substance, which should be confirmed by the remote device. Furthermore, in case of detecting a metal, the probability is high that such substance should not be removed. In case of abnormal smell values, this is also a good indicator for a substance that should not be removed.

Furthermore, the robot cleaner may have a front camera 195 for taking a picture of the floor to be cleaned in front of the robot cleaner 200. Furthermore, the robot cleaner may have a bottom camera 190 for taking a picture of the floor below the bottom of the main body. Moreover, as shown in the second embodiment a single camera 230 for taking pictures in several directions may be used and accommodated in a transparent housing.

Figure 2D:
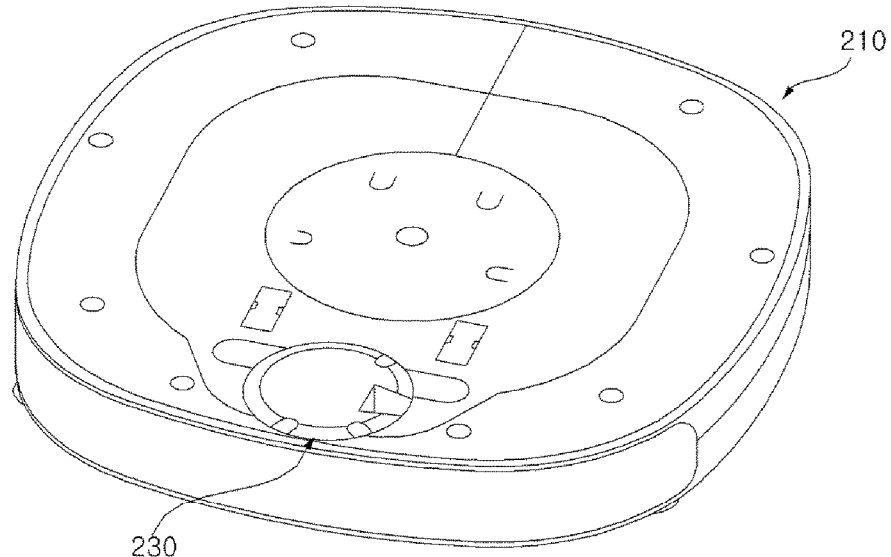
FIG. 2(d) is a perspective view of a robot cleaner of a third embodiment as shown FIG. 1.
Figure 2E:
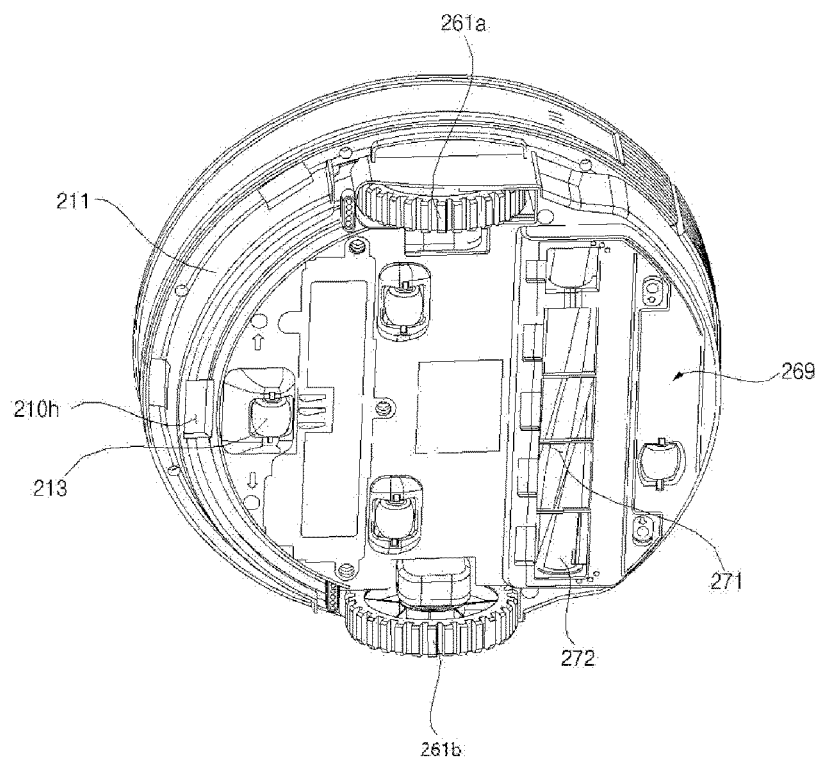
FIG. 2(e) is a bottom view of the robot cleaner of FIG. 2(d)
Figure 2F:
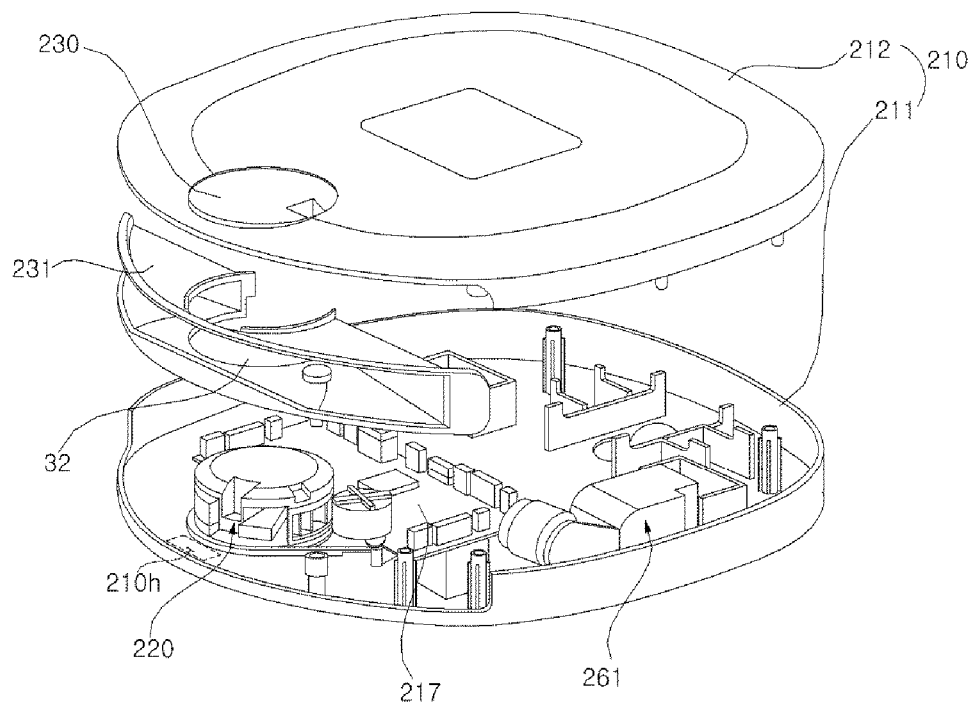
FIG. 2(f) is an exploded perspective view of the robot cleaner of FIG. 2(f)

FIG. 2(d) is a perspective view of a robot cleaner in accordance with another embodiment of the present disclosure. FIG. 2(e) is a bottom view of the robot cleaner of FIG. 2(d). FIG. 2(f) is an exploded perspective view of the robot cleaner of FIG. 2(a).

With reference to FIGS. 2(d), 2(e), and 2(f), the robot cleaner 200 may include a main body 210 provided with a lower opening 210h which is opened toward the floor. The main body 210 may travel about an area to be cleaned (hereinafter, "cleaning area") as a left wheel 261a and a right wheel 261b are rotated, and suction dust or substances located within the cleaning area through a suction unit 269.

The suction unit 269 may include a suction fan 272 provided within the main body 210 to generate a suction force, and a suction hole 271 through which an air flow generated by rotating the suction fan 272 is suctioned. Further, the suction unit 269 may include a filter (not shown) to collect foreign substances from the air flow suctioned through the suction hole 271 and a foreign substance acceptor (not shown) in which the foreign substances collected by the filter are accumulated.

Figure 4:
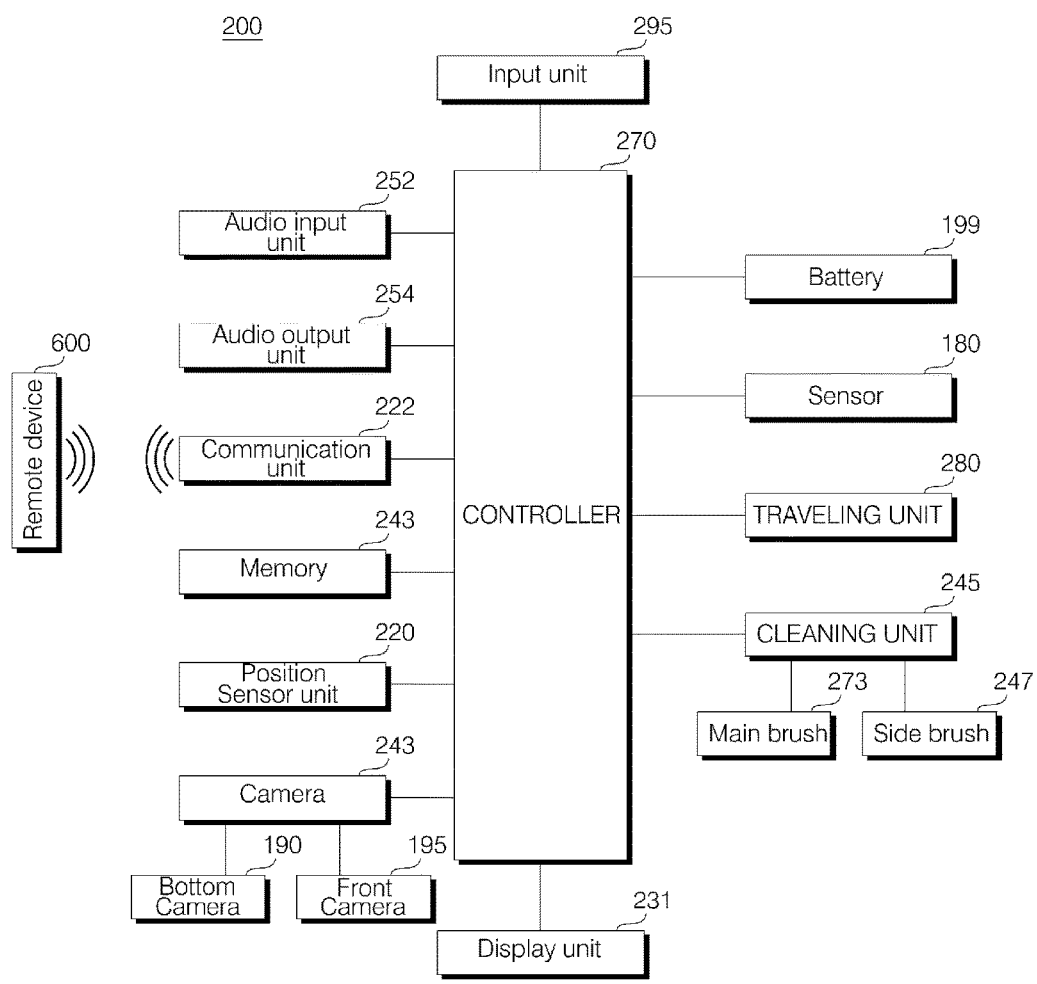
FIG. 4 is a schematic diagram of the components of a robot cleaner according to the first, second or third embodiment.

Traveling drive units (not shown) to drive the left wheel 261a and the right wheel 261b may also be provided. The traveling drive units may include a left wheel drive unit (not shown) to drive the left wheel 261a and a right wheel drive unit (not shown) to drive the right wheel 261b. The main body 210 may move forward or backward or be rotated by independently controlling the operations of the left wheel drive unit and the right wheel drive unit under the control of a controller 270 (such as shown in FIG. 4).

Figure 3:
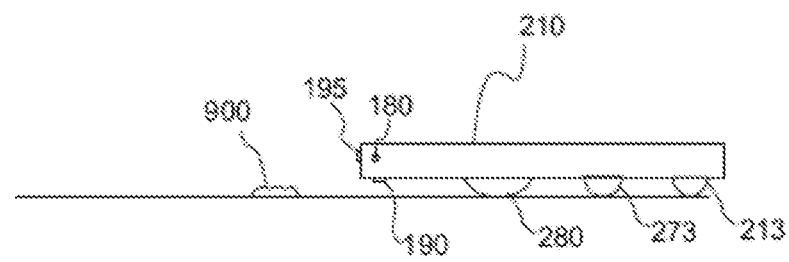
FIG. 3 illustrates a cleaning situation according to the invention.

For example, if the left wheel 261a is rotated in a regular direction by the left wheel drive unit and the right wheel 261b is rotated in the reverse direction by the right wheel drive unit, the main body 210 is rotated left or right. The controller 270 (such as shown in FIG. 4) may control the left wheel drive unit and the right wheel drive unit such that the rotational speed of the left wheel drive unit and the rotational speed of the right wheel drive unit are different, thus inducing translational motion of the main body 210 executing both straight motion and rotational motion. Under the control of the controller 270 (such as shown in FIG. 3), the main body 210 may avoid an obstacle or turn around the obstacle. At least one auxiliary wheel 213 to stably support the main body 210 may be further provided.

The main body 210 may include a main body lower part 211 to receive a rotation drive unit (not shown) and the traveling drive units (not shown). The main body part 210 may further include a main body upper part 212 covering the main body lower part 211.

A transparent member 232 may be arranged on a path of light output from a position sensor 220 or received from the outside. The transparent member 232 may be attached to the main body 210. An opening may be formed at the front portion of the main body 210 and the transparent member 232 may be fixed to a transparent member frame 231 installed at the opening.

The position sensor 220 senses the position of an obstacle and the distance from the obstacle by emitting light toward the obstacle. The position sensor 220 may be provided in the main body 210 so as to be rotatable. The position sensor 220 may include a light transmitter (not shown) to output light and a light receiver (not shown) to receive light. The light transmitter may include an LED or a laser diode.

In addition to the position sensor 200, a camera 230 may be provided on the main body upper part 212 to recognize an obstacle located in front of or proximate the robot cleaner 200. Particularly, the camera 230 may be provided on the transparent member frame 231, provided with the opening, and the transparent member 232. Thereby, images of an area above the robot cleaner 200 and an area in front of the robot cleaner 200 may be captured.

As shown in FIG. 3, a situation is illustrated in which the robot cleaner 200 is moving in one direction indicated by the arrow. The robot cleaner 200 is equipped with a front camera 195 taking pictures continuously or sequentially—of the floor area to be cleaned next by the robot cleaner 200 in a predetermined interval. As shown, the front camera 195 detects a foreign substance 900 located in front of the robot cleaner 200. The operation of the robot cleaner 200 when detecting a foreign substance 900 will be explained below.

The internal components of the robot cleaner 200 according to the first embodiment shown in FIGS. 2a, 2b and 2c and as shown in FIGS. 2d, 2e, and 2f, will be explained in further detail below with reference to FIG. 4.

With reference to FIG. 4, the robot cleaner 200 may include a position sensor unit 220, a communication unit 222 for communication with other external devices, a camera 230, 190, 195, a display unit 231 to display the operating state of the robot cleaner 200, a memory 243, a cleaning unit 245, an audio input unit 252, an audio output unit 254, a controller 270 to control the inside of the robot cleaner 200, a traveling unit 280 to move the robot cleaner 20, an input unit 295 for user input, a sensor unit 180, and a battery 199.

As shown in FIG. 4, the controller 270 included in the cleaner 200 may be connected to all components for controlling the internal or external components of the robot cleaner and for processing the inputs and outputs of the robot cleaner. The controller 270 may receive information from the components of the robot cleaner to process and/or control the cleaning operation of the robot cleaner.

In particular, the controller 270 may be connected to the main brush 273, to the side-brush assembly 247, and to the travelling device 280 for moving the robot cleaner in a desired direction. The controller 270 may also be connected to the at least one optical sensor 180, to the front camera 195 and/or the bottom camera 190. The controller 270 may also be connected to a communication unit 222 which is able to transmit and receive data to and from a remote device 600 wirelessly coupled to the communication unit 222. The controller 270 may also be connected to the battery 199 for controlling the battery 199 to have sufficient power for moving the cleaner in the room. For example, the battery 199 may only provide power corresponding to a certain power threshold that allows the controller 270 to move the robot cleaner 200 back to a charging station for charging the battery 199.

Furthermore, as shown in FIG. 4, the controller 270 may also be connected to a memory 243, in which certain parameters are stored. For example, the memory 243 may include predetermined thresholds for the cleanliness information. For instance the memory 243 may include a value for a humidity at which the controller 270 should decide for a foreign substance and should interrupt the operation to get a confirmation of the user. The memory 243 may also include a value for the detecting of metal. Thus, if a metal sensor 243 is used for detecting substances or components including metal, a certain threshold can be stored in the memory 243 at which the controller should stop the operation. Furthermore, Certain parameters for detecting a smell could also be stored in the memory 243.

Furthermore, the controller 270 may perform controlling operations depending on the cleaning program for the main brush 273 and the side-brush assembly 247.

In a further embodiment, certain patterns or pictures may be stored in the memory 243. Thus, the controller 270 may compare a picture taken by the camera 230 or the bottom or front camera 190, 195 and compare this picture with the pictures stored in the memory 243 to determine whether to stop or whether to continue the cleaning operation.

According to the first embodiment, the sensor 180 provides cleanliness information to the controller, wherein the cleanliness information may include a value sensed by the sensor. The cleanliness information may also be a picture or image taken by a camera. Based on the cleanliness information, the controller 270 will determine whether to stop or continue the cleaning operation.

When the controller 270 determines to stop the cleaning operation, the controller will further generate cleaning status information which may include the cleanliness information. The cleaning status information may further include the position of the location which is causing the cleanliness information. The cleaning status information may further include the status of the dust container and/or a completion cleaning report or the status of the battery.

The position sensor unit 220 may include a position sensor to sense the position of the robot cleaner 200. That is, as described above with reference to FIGS. 2a through 2f, the position sensor unit 220 may include the position sensor.

The position sensor may include a light transmitter (not shown) to output light and a light receiver (not shown) to receive light corresponding to output light. The position sensor may include a GPS module. The position sensor may sense the position of the robot cleaner 200 by receiving a GPS signal.

The communication unit 222 may include at least a wireless communication unit (not shown) executing wireless communication. The communication unit 222 may include a wireless communication unit (not shown) to communicate with the AP device 400 or the base station of a radio network. For example, the wireless communication unit may execute Wi-Fi communication.

The communication unit 222 may execute wireless data communication with the mobile terminal 600 through the AP device 400. For example, the communication unit 222 may receive a remote control signal from the remote device 300 or mobile terminal 600 and transmit the received remote control signal to the controller 270.

The communication unit 222 may receive power information from a power information transmission device (not shown). Accordingly, the communication unit 222 may include a communication module (not shown) in addition to the wireless communication unit.

The communication unit 222 may be provided within the robot cleaner 200, or attached to a case of the robot cleaner 200 and connected to an inner circuit of the robot cleaner 200.

The camera 230, 195 may also be provided on the main body upper part 212 to recognize an obstacle located in front of the robot cleaner 200. The camera 230 may include a CCD module or a CMOS module. The camera 230 may be an IR camera to detect a distance from an external object. The camera 230 may include a stereo camera. The camera 230 may also include a plurality of RGB cameras separated from each other by designated intervals.

The display unit 231 may display the operating state of the robot cleaner 200 under control of the controller 270. Accordingly, the display unit 231 may include an LCD or LED display to display various pieces of information.

The memory 243 may store a variety of data for the overall operation of the robot cleaner 200. The memory 243 may also include a voice recognition algorithm.

The cleaning unit 245 may suction foreign substances located under the robot cleaner 200. For this purpose, the robot cleaner 200 may travel by use of the traveling unit 280 and suction foreign substances by operating the cleaning unit 245 during traveling or during a temporary stoppage.

The cleaning unit 245 may include the suction unit 269, as described above with reference to FIGS. 2a through 2f. The suction unit 269 may include a suction fan 272 provided within the main body 210 to generate suction force, and a suction hole 271 through which an air flow generated by rotating the suction fan 272 is suctioned. The suction unit 269 may further include a filter (not shown) to collect foreign substances from the air flow suctioned through the suction hole 271 and a foreign substance acceptor (not shown) in which the foreign substances collected by the filter are accumulated.

The audio input unit 252 may receive user voice input. For this purpose, the audio input unit 252 may include a microphone. The audio input unit 252 may convert received voice into an electrical signal and transmit the electrical signal to the controller 270.

The audio output unit 254 may convert an electrical signal received from the controller 270 into an audio signal and then output the audio signal. For this purpose, the audio output unit 254 may include a speaker.

The controller 270 may control the overall operation of the robot cleaner 200. The controller 270 may control the operations of the position sensor unit 220, the communication unit 222, the camera 230, the display unit 231, the memory 243, the cleaning unit 245, the audio input unit 252, the audio output unit 254, the traveling unit 280, the input unit 295, and/or the like.

The traveling unit 280 may move the robot cleaner 200. For this purpose, the traveling unit 280, as described above with reference to FIGS. 2a through 2f, may include the left wheel 261a, the right wheel 261b and the traveling drive units (not shown) to drive the left wheel 261a and the right wheel 261b. Particularly, the traveling drive units may include a left wheel drive unit to drive the left wheel 261a and a right wheel drive unit to drive the right wheel 261b. The traveling unit 280 may control one of regular rotation and reverse rotation of each of the left wheel 261a and the right wheel 261b under the control of the controller 270, thereby allowing the main body 210 to move forward or backward or to be rotated.

For example, if the left wheel 261a is rotated in a regular direction and the right wheel 261b is rotated in the reverse direction, the main body 210 is rotated left or right. Further, the controller 270 may control the left wheel 261a and the right wheel 261b such that the rotational speed of the left wheel 261a and the rotational speed of the right wheel 261b are different, thus inducing translational motion of the main body 210 executing both straight motion and rotational motion.

The input unit 295 may include one or more local keys for user input.

Figure 5:
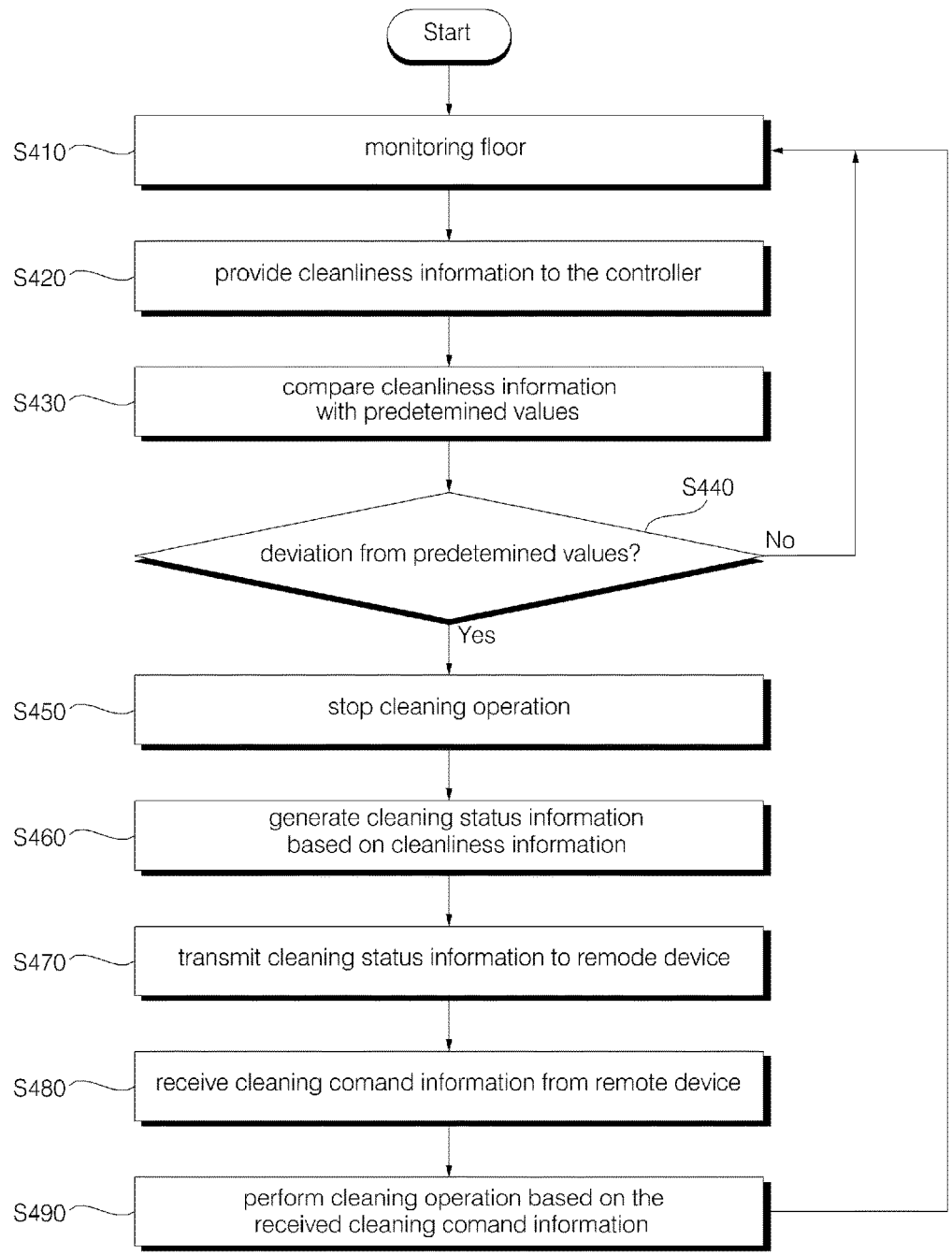
FIG. 5 is a flowchart for explaining the operation of the robot cleaner according to a first embodiment.

The operation of the controller 270 will be explained in further detail below with reference to FIG. 5 illustrating the method according to a first embodiment. As described in the embodiment shown in FIG. 5, after starting the cleaning operation of the robot cleaner in step S405, the robot cleaner 200 may clean and monitor the floor in step S410, preferably by use of the at least one or multiple sensors 180 and/or cameras 190, 195.

The cleanliness information sensed by the one or more sensors 180 and/or the cameras 190, 195 may be provided to the controller 270 in step S420. In step s430, the controller 270 may compare the received cleanliness information with predetermined parameters, which might be stored in the memory 243.

In case of detecting a deviation between the cleanliness information and a predetermined parameter, in step S440, the controller 270 may stop the cleaning operation, in step S450. After stopping the cleaning operation in step S450, the controller 270 may generate cleaning status information for being transmitted to the remote device or mobile terminal 600, in steps S460 and S470. The cleaning status information is generally based on the cleanliness information received from the one or more sensors 180 and other parameters sensed by or stored in the robot cleaner 200. In step S470, the cleaning status information may be transmitted to the remote device or mobile terminal 600.

Figure 6:
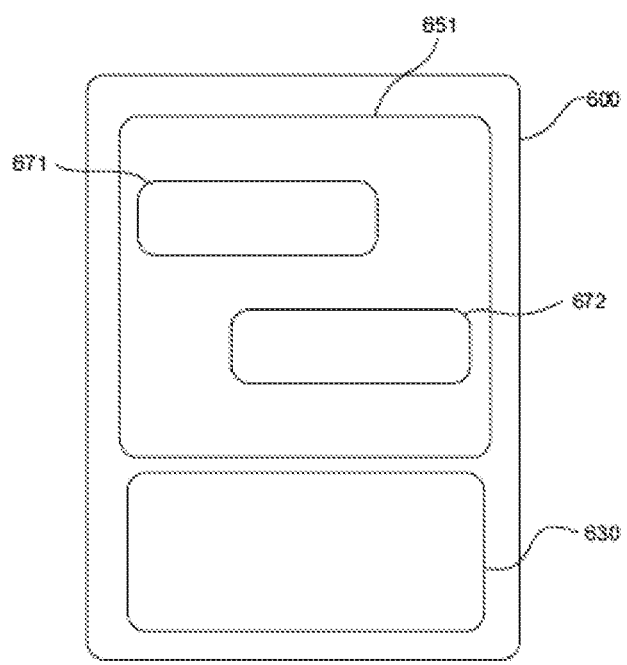
FIG. 6 is an illustration showing the remote device for controlling the robot cleaner.

The remote device may be a mobile terminal 600 of a user, such as shown in FIG. 6. It is understood that the remote device may be any type of computing device or display device that is able to receive messages and to display the messages on a display 651 thereon. The user may be notified (e.g., by a sound or visual display of a message 620) that the robot cleaner 200 has detected a foreign substance and has interrupted the cleaning operation since certain thresholds or predetermined parameters are exceeded or underrun.

Based on the cleaning status information illustrated as a message 620, which is provided to the user, the user may decide, for example, (1) whether to stop the cleaning operation and to decide after being at home, whether to continue the cleaning operation or not, (2) whether the robot cleaner should clean the detected foreign substance 900, (3) or whether the robot cleaner should move around the location where the foreign substance has been found and should not clean a predetermined area around the foreign substance detected by the robot cleaner.

In step S480, the user may input a certain cleaning command 640 which is transmitted as cleaning command information from the remove device 600 to the robot cleaner. In step S490, the robot cleaner 200 may then execute the cleaning operation based on the received cleaning command information.

In FIG. 6, a typical remote device 600 is shown. The remote device 600 has a display 610 for displaying messages 620. The remote device 600 is configured to receive commands from the user via an input device 630, which may be a touchscreen panel. The user may input a cleaning command 640 and transmit the cleaning command to the robot cleaner, the command being received at the communication unit 222 of the cleaner 200. The remote device 600 may display the cleaning status information 620 received from the robot cleaner 200. Based on the transmitted values or pictures, the user can decide whether the cleaner 200 should carry on or should stop the cleaning process, or should go around (e.g., avoid) the detected foreign substance 900. For example, the user is able to instruct the robot cleaner 200 not to clean a pet's increment.

For example, using the remote device 600, the user may simply input a YES or NO for the robot cleaner 200 to carry on with a cleaning process, which command is transmitted to the robot cleaner 200, received by the communication unit 222, and processed by the controller 270, respectively. In particular, when the user recognizes the foreign substance detected by the one or more sensors 180 and/or the cameras 190, 195, the user may define an area around the location which should not be cleaned by the robot cleaner 200.

Furthermore, the user may instruct the robot cleaner 200 to return to the charging station to stop the cleaning operation and to ensure a fully charged battery. Alternatively, the user might instruct the robot cleaner 200 to clean another room, which should be also cleaned.

The robot cleaner 200 as described above may be equipped with one or more different sensors 180 or cameras 190, 195. In case of only having picture information of a foreign substance, the controller 270 might perform a pattern recognition by using pictures stored in the memory 243 and comparing the stored pictures with the picture taken by one of the cameras 190, 195 or the optical sensor 180. Thereby it might be possible to detect a toy, such as a Lego™ brick, which should not be suctioned into the suction port 271 and where a cleaning operation should be avoided.

The controller 270 may decide by its own not to clean a detected toy element located on the floor. For example, the controller may control the robot cleaner 200 to travel around the detected toy element or other element automatically. Alternatively, the controller 270 may control the side brush assemblies 247 and turn them in an opposite direction so that the detected element is pushed away from the area to be cleaned by the robot cleaner 200, preferably into an area which was already cleaned and where the user can find the detected toy element later easily.

The determination by the controller 270 whether to transmit the cleaning status information to the user may be taken if only one of the monitored parameters are exceeded or underrun, respectively, or if for instance a first or second threshold of a gas value or smell value has been detected or in case of a positive pattern matching of the picture taken from the detected foreign substance to allow the controller 270 to decide to transmit the cleaning status information to the user and to wait for receiving a cleaning command information from the user.

A further possibility is that, after detecting that one predetermined parameter has being exceeded or underrun, to take pictures and to try to further find out by the controller 270 which kind of foreign substance has been detected, before prompting the user by transmitting a cleaning status information to the user to thereby reduce the interruptions of the user, respectively. Thus, only in critical situations, when a non-defined foreign substance 900 has been detected, the user will be informed to confirm whether to stop or to continue the cleaning operation. In simple situations, e.g. when detecting a Lego-brick, the controller 270 may decide by itself not to clean that location without transmitting the cleaning status information to the remote device 600 for asking the user to confirm whether to stop or to continue the cleaning process.

In a further embodiment of the disclosure, the controller 270 is able to process the cleaning command information received from the user after having transmitted cleaning status information to the user to thereby provide an adaptive learning process. So after having once received a cleaning command for continuing the cleaning operation in case of a detected toy or other component, the controller 270 may store the picture or transmitted status information in the memory 243 which has been taken or generated before as a positive picture or status information, so in the next case of detecting such toy or element the controller 270 may avoid to transmit the cleaning status information and to wait for a cleaning command of the user and to take the decision by itself not to clean the location, where the detected foreign substance has been found.

In a further embodiment of the invention, it is possible, that if the controller 270 notices that no connection to the remote device 600 could be established with its communication unit 222 to transmit the cleaning status information to the remote device of the user, the robot cleaner 200 might return to the charging station, where a wired connection to the communication network is possible via the power supply or Ethernet connection to thereby transmit the information to remote device 600 of the user or the robot cleaner 200 might return to a place, where a proved communication status was noticed last. Thus, it is possible that the robot cleaner 200 can reliably transmit the status cleaning information to the user when communication with the communication network is stopped.

Alternatively, in such situation of not being able to transmit the cleaning status information to the user, the robot cleaner may independently decide just to clean another room or another location to thereby avoid cleaning the location at which the foreign substance has been detected.

By having such possibility of informing the user and enabling user interaction with the robot cleaner 200, the user is able to more conveniently instruct the robot cleaner].

Figure 7:
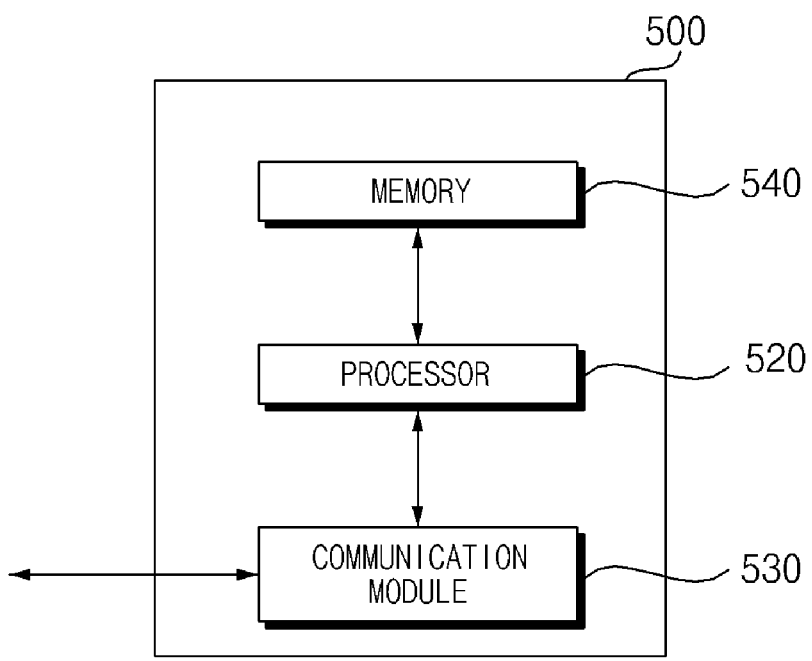
FIG. 7 is an inner block diagram of a server of FIG. 1.

FIG. 7 is an inner block diagram of the server shown in FIG. 1. With reference to FIG. 7, the server 500 may include a communication module 530, a memory 540 and a processor 520. The communication module 530 may receive information regarding the robot cleaner 200 from the remote device or mobile terminal 600. Particularly, the communication module 530 may receive product information of the robot cleaner 200. Further, the communication module 530 may transmit registration result information of the received product information of the robot cleaner 200 to the mobile terminal 600.

The communication module 530 may exchange data with the robot cleaner 200. For example, the communication module 530 may receive information regarding the robot cleaner 200 from the robot cleaner 200. As another example, the communication module 530 may transmit cleaning pattern information, cleaning course information, and/or the like, to the robot cleaner 200.

Accordingly, the communication module 530 may include an Internet module or a mobile communication module. The memory 540 may store the received product information of the robot cleaner 200 to register the product of the robot cleaner 200. The memory 540 may store the latest cleaning pattern information and the latest cleaning course information of the robot cleaner 200, and/or the like.

The processor 520 may control the overall operation of the server 500. If the product information of the robot cleaner 200 is received from the mobile terminal 600, the processor 520 may control generation of product registration result information of the robot cleaner 200. Further, the processor 520 may control transmission of the generated product registration result information to the mobile terminal 600. Further, the processor 520 may control transmission of the latest cleaning pattern information and the latest cleaning course information of the robot cleaner 200, and/or the like, to the robot cleaner 200.

The server 500 may be a server operated by a manufacturer of the robot cleaner 200 or a server operated by an application store operator regarding the robot cleaner 200.

Figure 8:
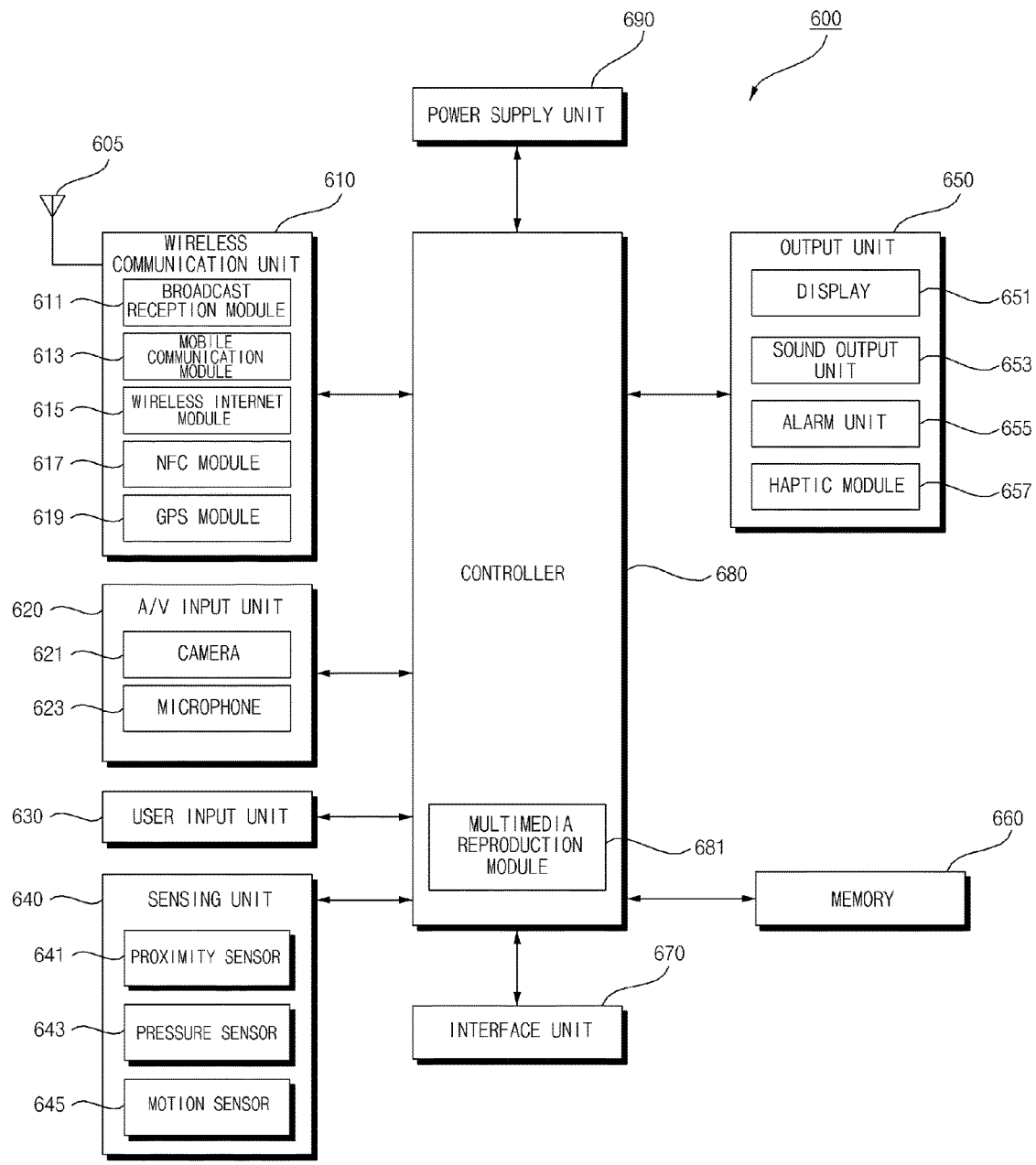
FIG. 8 is an inner block diagram of a mobile terminal of. 1.

FIG. 8 is an inner block diagram of the mobile terminal or remote device 600 shown in FIGS. 1 and 6. With reference to FIG. 8, the mobile terminal 600 may include a wireless communication unit 610, an audio/video (A/V) input unit 620, a user input unit 630, a sensing unit 640, an output unit 650, a memory 660, an interface unit 670, a controller 680, and a power supply unit 690. It is understood that the embodiment is not required to disclose every one of these components.

The wireless communication unit 610 may exchange data with a power management unit 500 through a network router 550. For example, if the mobile terminal 600 is in a power monitoring mode of an internal power network, the wireless communication unit 610 may transmit a power monitoring request and receive monitoring information thereby. As another example, if the mobile terminal 600 is a remote control mode of the internal power network, the wireless communication unit 610 may transmit a remote control signal. Then, the wireless communication unit 610 may receive result information of remote control.

The wireless communication unit 610 may include a broadcast receiver module 611, a mobile communication module 613, a wireless Internet module 615, an NFC module 617 and a Global Positioning System (GPS) module 619. It is understood that the wireless communication unit 610 is not required to include all of these elements.

The broadcast receiver module 611 may receive at least one of a broadcast signal and broadcast related information from an external broadcast management server through a broadcast channel. For example, the broadcast channel may include a satellite channel or a terrestrial channel. The broadcast signal and/or the broadcast related information received through the broadcast receiver module 611 may be stored in the memory 660.

The mobile communication module 613 may transmit/receive a wireless signal to/from at least one of a base station, an external terminal and a server on a mobile communication network. Here, the wireless signal may include a voice call signal, a video call signal or various types of data according to transmission/reception of a text/multimedia message.

The wireless Internet module 615 refers to a module for connection to wireless Internet. The wireless Internet module 615 may be provided at the inside or outside of the mobile terminal 600. For example, the wireless Internet module 615 may execute Wi-Fi-based wireless communication or Wi-Fi Direct-based wireless communication.

The NFC module 617 may execute near field communication. If the NFC module 617 approaches an NFC tag or an electronic device having an NFC module mounted therein within a designated distance, i.e., executes tagging, the NFC module 617 may receive data from the corresponding electronic device or transmit data to the corresponding electronic device. Such near field communication techniques include, for example, Bluetooth, Radio Frequency Identification (RFID), Infrared Data Association (IrDA), Ultra Wideband (UWB), ZigBee communication, and/or the like.

The GPS module 619 may receive position information from a plurality of GPS satellites. The A/V input unit 620 may receive audio signal or video signal input and include a camera 621 and a microphone 623.

The user input unit 630 generates input data which a user inputs to control the operation of the terminal 600. The user input unit 630 may include a keypad, a dome switch, a touch pad (constant pressure/electrostatic), and/or the like.

The sensing unit 640 may sense the current state of the mobile terminal 600, such as the opening/closing state of the mobile terminal 600, the position of the mobile terminal 600, and whether or not a user contacts the mobile terminal 600, and generate a sensing signal to control the operation of the mobile terminal 600.

The sensing unit 640 may include a proximity sensor 641, a pressure sensor 643, a motion sensor 645, and/or the like. The motion sensor 645 may sense the motion or position of the mobile terminal 600 using an acceleration sensor, a gyro sensor, a gravity sensor, and/or the like. Particularly, the gyro sensor is a sensor to measure an angular velocity and may thus sense a direction (an angle) rotated from a reference direction.

The output unit 650 may include the display 651, a sound output module 653, an alarm unit 655, a haptic module 657, and/or the like.

The display 651 outputs and displays information processed by the mobile terminal 600. If the display 651 and the touch pad form a layered structure to produce a touchscreen, as described above, the display 651 may be used as an input device, through which information may be input by user touch, as well as an output device.

The sound output module 653 outputs audio data received from the wireless communication unit 610 or stored in the memory 660. The sound output module 653 may include a speaker, a buzzer, and/or the like.

The alarm unit 655 outputs a signal informing the mobile terminal 600 of occurrence of an event. For example, the alarm unit 655 may output a signal through vibration. The haptic module 657 may generate various haptic effects which a user may feel. As a representative example of haptic effects generated by the haptic module 657, vibration may be used.

The memory 660 may store a program to process and control the controller 680 and execute a function of temporarily storing input and/or output data (for example, a phone book, a message, a still image, a moving picture, and/or the like).

The interface unit 670 may function as an interface with all external devices connected to the mobile terminal 600. For example, the interface unit 670 may receive data or power from these external devices and transmit the received data or power to the respective elements within the mobile terminal 600, and transmit data within the mobile terminal 600 to the external devices.

The controller 680 generally controls the operations of the respective elements, thus controlling the overall operation of the mobile terminal 600. For example, the controller 680 may execute control and processing related to voice call, data communication, video call, and/or the like. Further, the controller 680 may include a multimedia reproduction module 681 to reproduce multimedia.

The multimedia reproduction module 681 may be implemented as hardware within the controller 680 or implemented as software separately from the controller 680.

The power supply unit 690 may receive external power and/or internal power under the control of the controller 680 and then supply power required to operate the respective elements.

FIG. 8 is an exemplary block diagram of the mobile terminal 600 in accordance with one embodiment of the present disclosure. The respective elements of the block diagram may be combined or omitted or new elements may be added according to specifications of the mobile terminal 600. In other words, as needed, two or more elements may be combined into a single unit or one element may be subdivided into two or more elements. Further, it is understood that the functions executed by the respective blocks are intended to describe the embodiment of the present disclosure and the detailed operations or devices thereof do not limit the scope of the present invention.

Figure 9:
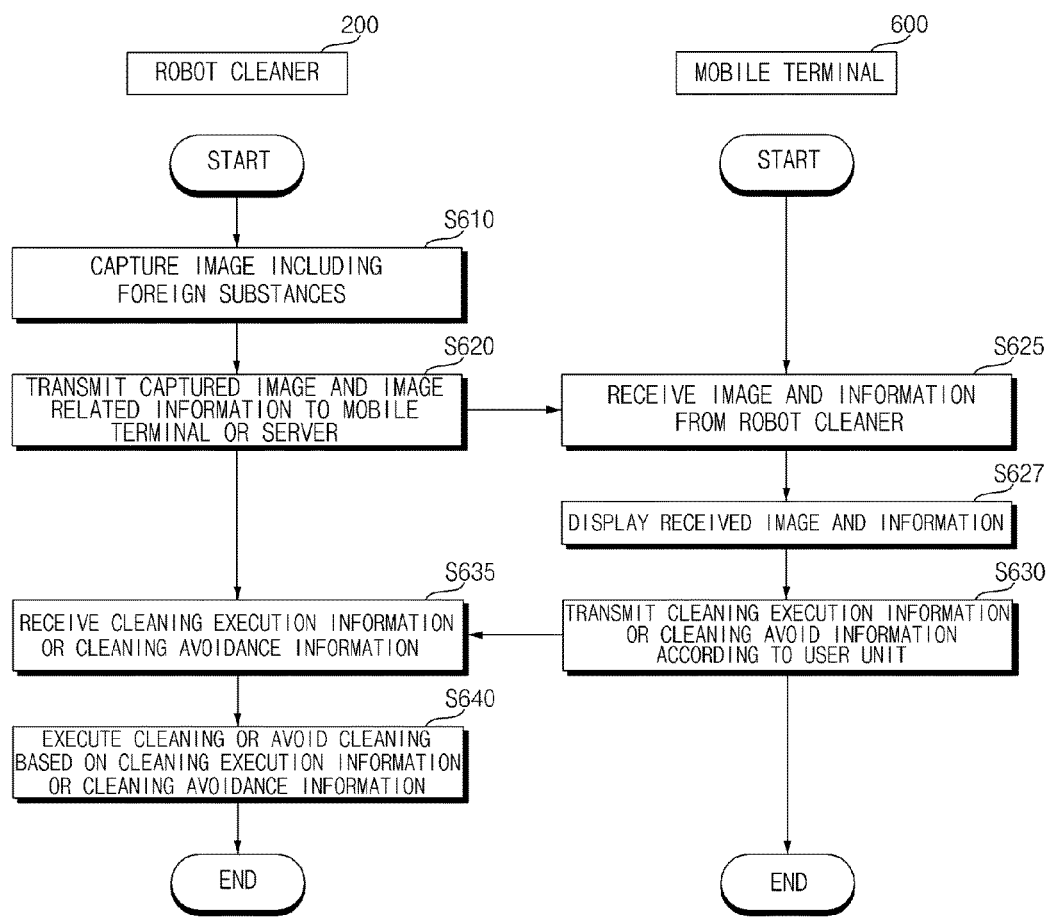
FIG. 9 is a flowchart illustrating an operating method of a robot cleaner in accordance with another embodiment of the present disclosure.

FIG. 9 is a flowchart illustrating an operating method of a robot cleaner in accordance with one embodiment of the present disclosure. FIGS. 10 through 15(*b*) are reference views to describe the operating method of FIG. 9.

With reference to FIG. 9, the camera 230 of the robot cleaner 200 may capture an image including foreign substances (operation S610). Thereafter, the controller 270 of the robot cleaner 200 may control transmission of the cleanliness information being represented as captured image and image related information to the mobile terminal 600 or the server 500 (operation S620). The mobile terminal 600 may then receive the cleanliness information including the captured image and the image related information from the robot cleaner 200 (operation S625). The controller 680 may then control a display of the received image and the image related information on the display 651 (operation S627).

The controller 680 may then transmit cleaning command information being cleaning execution information (e.g., Yes) or cleaning avoidance information (e.g., No) to the robot cleaner 200 according to user input (operation S630). The controller 270 of the robot cleaner 200 may receive the cleaning execution information (e.g., Yes) or the cleaning avoidance information (e.g., No) from the mobile terminal 600 through the communication unit 222 (operation S635).

The controller 270 of the robot cleaner 200 may control the robot cleaner 200 so as to clean an area around foreign substances based on the cleaning execution information or not to clean the area around the foreign substances based on the cleaning avoidance information (operation S640). In other words, the controller 270 of the robot cleaner 200 may control the robot cleaner 200 so as to selectively clean the area around the foreign substances.

In a non-limiting example, if the foreign substance is excrement of a pet, a user located at a remote position may verify an excrement image displayed on a mobile terminal 600 and transmit cleaning avoidance information (e.g., No) to the robot cleaner 200. Thereby, although the robot cleaner 200 is in the cleaning mode, the robot cleaner 200 may not clean an area around the excrement, thus preventing the area around the excrement from becoming more contaminated by the cleaning procedure.

According to another non-limiting example, if the foreign substance is hair, a user located at a remote position may verify a hair image displayed on a mobile terminal 600 and transmit cleaning execution information (e.g., Yes) to the robot cleaner 200. Thereby, although the robot cleaner 200 is not in the cleaning mode, the robot cleaner 200 may clean the hairs, thus keeping the floor clean.

The capture of the image in the operation S610 may be executed based on a foreign substance related image capture command from the mobile terminal 600. For example, if a foreign substance related image capture command is received from the mobile terminal 600 through the communication unit 222, the controller 270 of the robot cleaner 200 may control the traveling unit 280 so that the robot cleaner 200 travels in the home.

Further, the controller 270 may activate the camera 230 and control the camera 230 so as to capture an image in the home while traveling. The capture of the image in the operation S610 may be executed automatically during the traveling mode or the cleaning mode of the robot cleaner 200. That is, although no foreign substance related image capture command is received from the mobile terminal 600, the controller 270 of the robot cleaner 200 may automatically activate the camera 230 during the traveling mode or the cleaning mode and thus control the camera 230 so as to capture an image in the home during traveling or cleaning.

The controller 270 of the robot cleaner 200 may control transmission of the captured image to at least one of the mobile terminal 600 and the server 500 regardless of whether or not the image capture command is received. Further, the controller 270 of the robot cleaner 200 may compare the captured image with an image pre-stored in the memory 243 transmission of and control transmission of the captured image to at least one of the mobile terminal 600 and the server 500, if a difference between the captured image and the stored image is greater than or equal to a designated value.

For example, only if foreign substances are present on the floor in the home, the controller 270 of the robot cleaner 200 may control transmission of a captured image including the foreign substances to at least one of the mobile terminal 600 and the sever 500.

The controller 270 of the robot cleaner 200 may control transmission of related information together with transmission of the captured image. For example, the controller 270 of the robot cleaner 200 may control transmission of a conversation-type message "Foreign substances are found" to at least one of the mobile terminal 600 and the server 500 when the captured image is transmitted.

In relation to operation S627, the controller 680 of the mobile terminal 600 may control display of the received image and the related information in a conversation window.

Further, the controller 680 may control display of the image related information as a conversation-type message. For example, the controller 680 may control display of conversation contents through a conversation window with the robot cleaner 200. Thereby, a user may have a conversation with the robot cleaner 200 and feel an emotional connection to the robot cleaner 200.

In relation to operation S630, the controller 680 of the mobile terminal 600 may recognize cleaning execution information or cleaning avoidance information based on characters input to the conversation window by a user, and control transmission of the cleaning execution information or the cleaning avoidance information to the robot cleaner 200.

According to a non-limiting example, if user conversation content "Do not clean area" is input, the controller 680 of the mobile terminal 600 may determine this content as cleaning avoidance information and control transmission of the cleaning avoidance information to the robot cleaner 200. The controller 270 of the robot cleaner 200 may execute cleaning of an area around the foreign substances according to the cleaning execution information and transmit cleaning completion information to the mobile terminal 600 after cleaning of the area around the foreign substances has been completed.

According to another non-limiting example, if user conversation content "They may be cleaned" is input, the controller 680 of the mobile terminal 600 may judge this content as cleaning execution information and control transmission of the cleaning execution information to the robot cleaner 200. The controller 270 of the robot cleaner 200 may control transmission of response information corresponding to the cleaning avoidance information to the mobile terminal 600.

Additionally, for example, if a pet mode is set, the controller 270 of the robot cleaner 200 may control the camera 230 so as to capture an image in the home while traveling about the home. If an image related to excrement in the pet mode is then captured, the controller 270 of the robot cleaner 200 may control automatic transmission of the image related to excrement and image related information to the mobile terminal 600.

Figure 10:
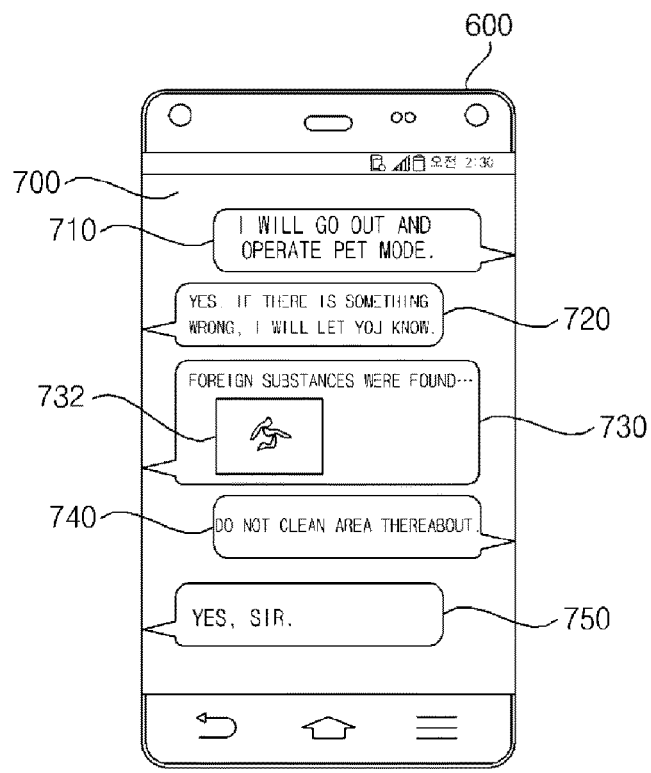
FIGS. 10, 11(a), 11(b), 11(c), 11(d), 12, 13(a), 13(b), 13(c), 13(d), 14(a), 14(b), 15(a), and 15B are reference views to describe the operating method of FIG. 9.
Figure 11A:
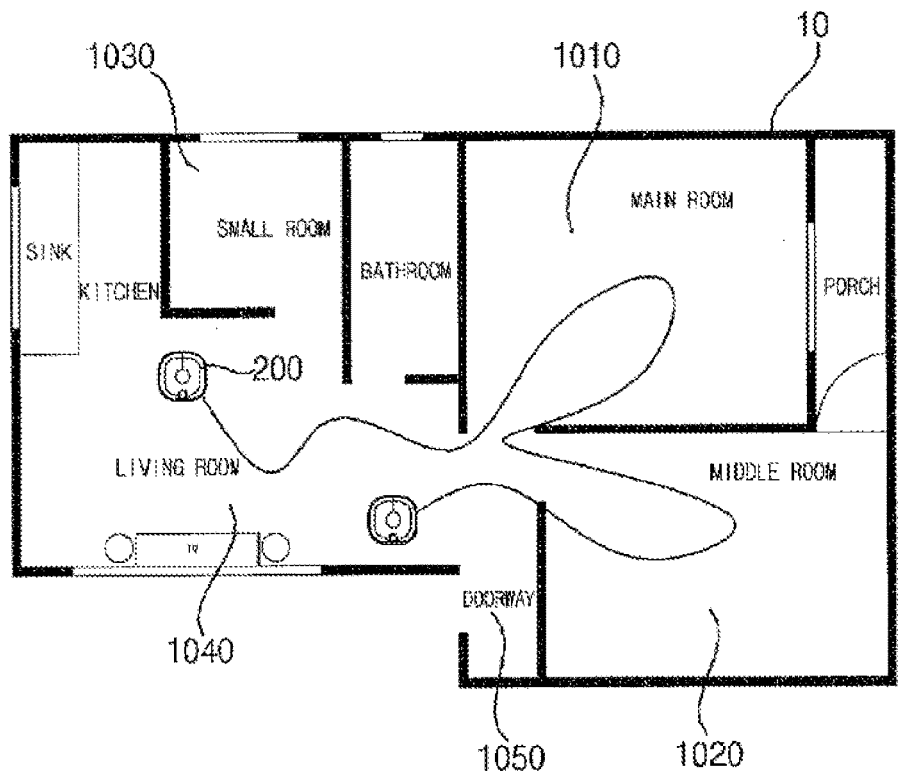
Figure 11B:
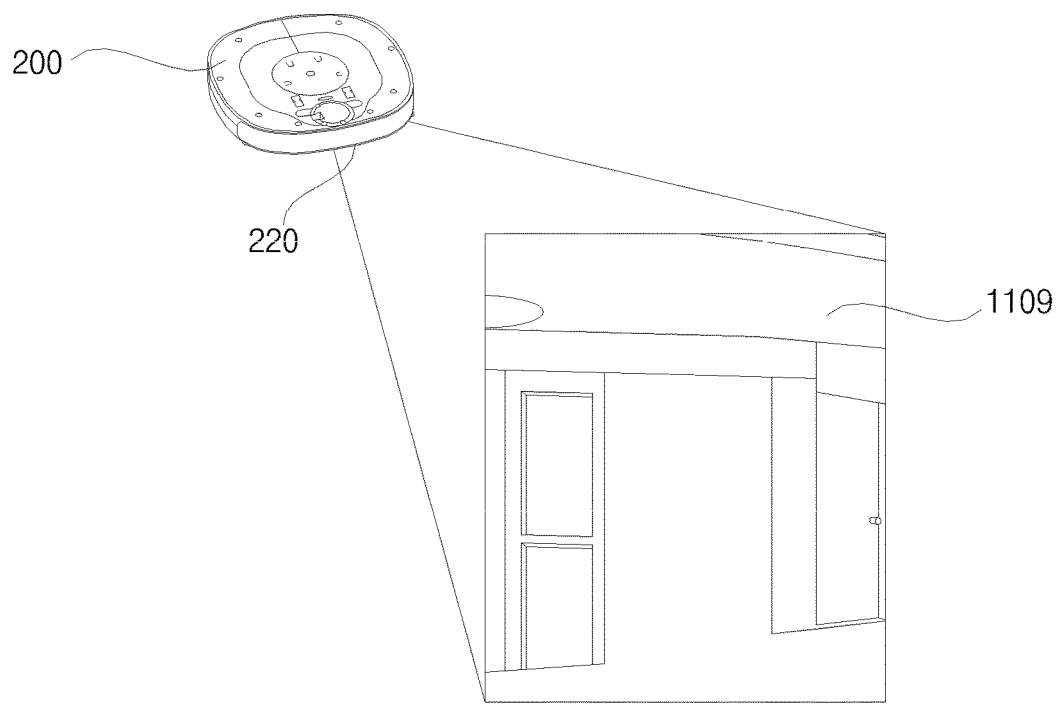
Figure 11C:
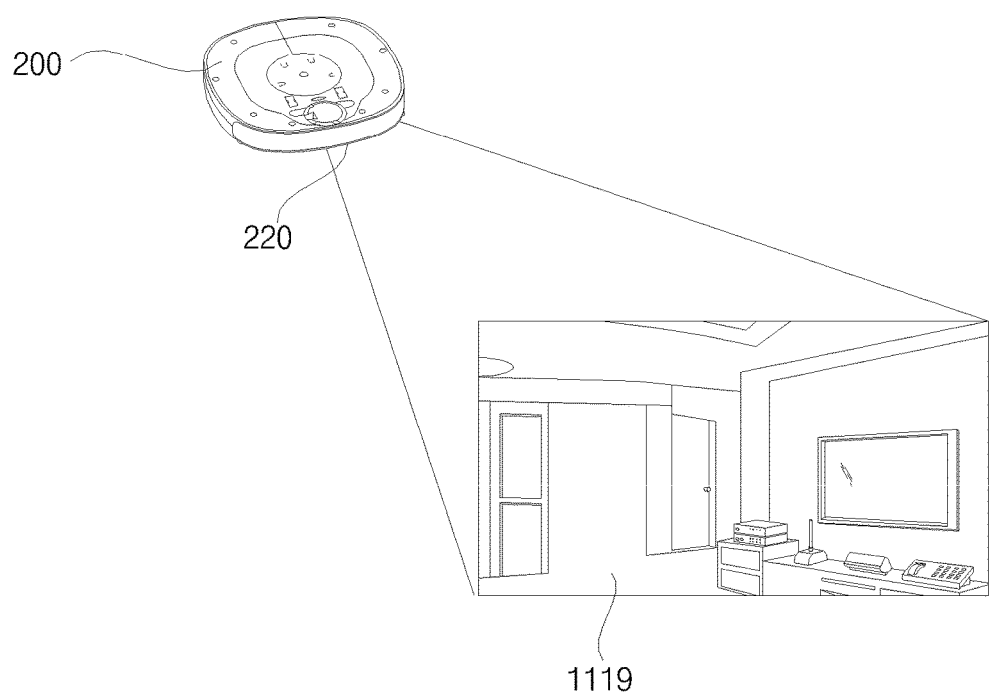
Figure 11D:
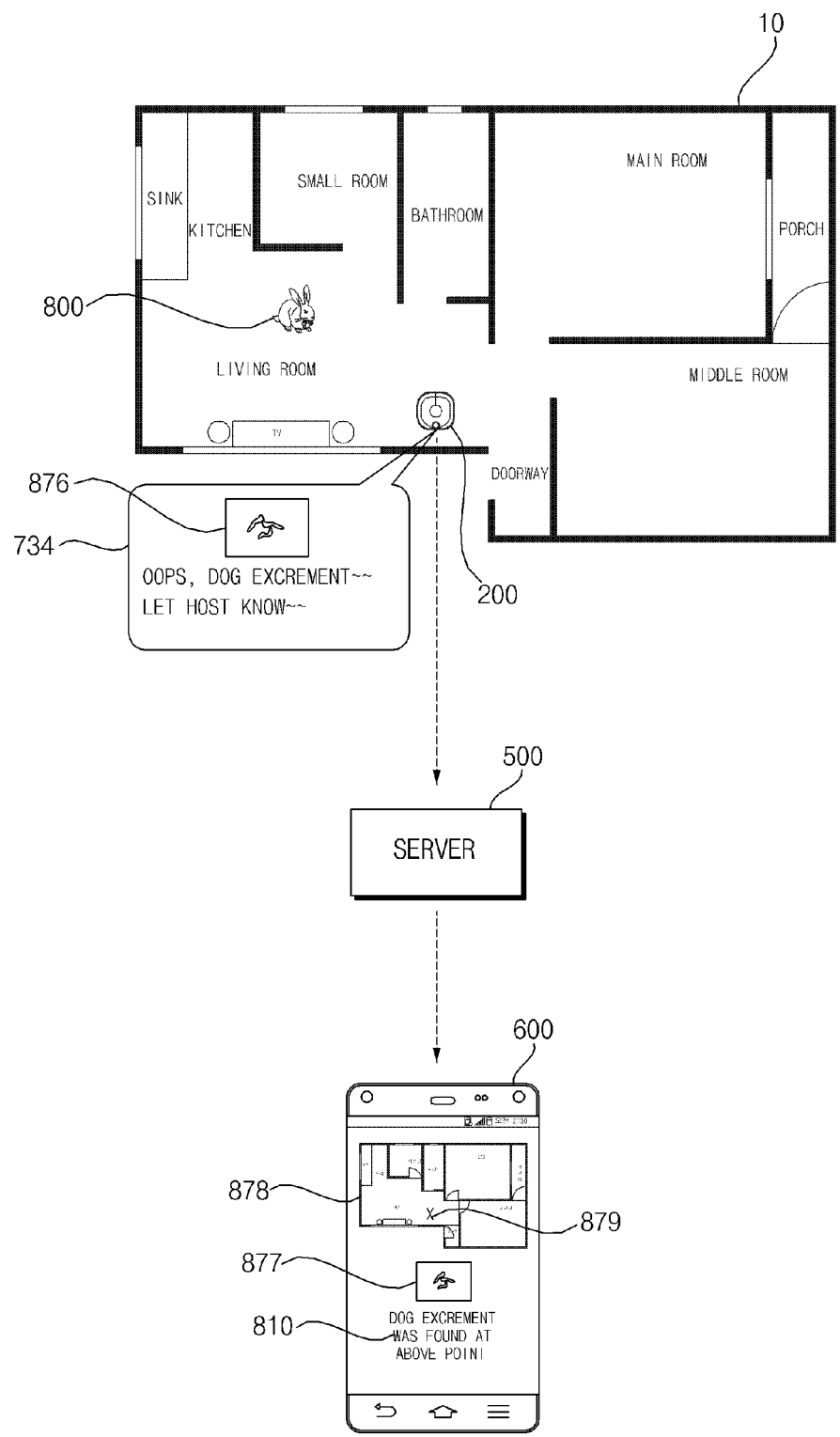

FIG. 10 exemplarily illustrates conversation content related to cleaning avoidance information between the robot cleaner 200 and the mobile terminal 600, on the mobile terminal 600. With reference to FIG. 10, a conversation window 700 for exchange of data with the robot cleaner 200 may be displayed on the mobile terminal 600.

As shown, if text 710 related to a pet mode command is input by a user, the controller 680 of the mobile terminal 600 may analyze the text 710 and transmit the pet mode command to the robot cleaner 200. The controller 270 of the robot cleaner 200 may receive the pet mode command and transmit a response message in response to the pet mode command to the mobile terminal 600, through the communication unit 222.

The controller 680 of the mobile terminal 600 may control display of text 720 corresponding to the response message in the conversation window. The controller 270 of the robot cleaner 200 may control execution of the pet mode. That is, the controller 270 of the robot cleaner 200 may control the traveling unit 280 so that the robot cleaner 200 travels about the home. During traveling, the controller 270 of the robot cleaner 200 may control the camera 230 and the sensors 180 so as to capture images or sense cleanliness information.

FIG. 11(*a*) exemplarily illustrates traveling of the robot cleaner 200 about home 10. During such traveling, the camera 230 or sensor 180 may be activated and execute image capture or sensing. FIG. 11(*b*) exemplarily illustrates a main room captured image 1109. FIG. 11(*c*) exemplarily illustrates a living room captured image 1119.

The controller 270 of the robot cleaner 200 may compare a captured image with an image pre-stored in the memory 243 and determine whether or not foreign substances are present according to a difference between the two images. For example, the controller 270 of the robot cleaner 200 may compare the main room captured image 1109 of FIG. 11(*b*) with an image pre-stored in the memory 243, and determine whether or not foreign substances are present. In particular, if a difference between the main room captured image 1109 of FIG. 11(*b*) and the image pre-stored in the memory 243 is a designated value or less, the controller 270 of the robot cleaner 200 may determine that no foreign substances are present.

According to another example, the controller 270 of the robot cleaner 200 may compare the living room captured image 1119 of FIG. 11(*c*) with an image pre-stored in the memory 243, and determine whether or not foreign substances are present. In particular, if a difference between the living room captured image 1119 of FIG. 11(*c*) and the image pre-stored in the memory 243 is a designated value or less, the controller 270 of the robot cleaner 200 may judge that no foreign substances are present.

FIG. 11(*d*) exemplarily illustrates a situation when a pet 800 is present within the room (e.g., a living room of a home) and excrement is present near the pet 800. The controller 270 of the robot cleaner 200 may compare a captured image 876 including excrement with a pre-stored image and determine that foreign substances are present if a difference between the two images is greater than or equal to a designated value.

Upon determining that foreign substances are present, the controller 270 of the robot cleaner 200 may control transmission of the captured image 876 including excrement and related information to a predetermined user's mobile terminal 600. Although FIG. 11(*d*) exemplarily illustrates that the captured image 876 and the related information are transmitted to the mobile terminal 600, preferably through the server 500, the captured image 876 and the related information may be transmitted directly to the mobile terminal 600 not via the server 500.

For example, the controller 680 of the mobile terminal 600 may control display of a home map image 879, a captured image 877, and related information 810. The home map image 879 may be received from the robot cleaner 200 or stored in the memory 660 of the mobile terminal 600. A user may simply sense that excrement of a pet is generated in the home through the displayed brief home map image 879, captured image 877, and related information 810.

If an image 732 including foreign substances in the home and related information 730 are received from the robot cleaner 200 during display of the conversation window 700 of FIG. 10, the controller 680 of the mobile terminal 600 may control display of the image 732 including foreign substances and the related information 730, as exemplarily shown in FIG. 10.

If a user inputs user conversation content such as "Do not clean area" 740, the controller 680 of the mobile terminal 600 may determine this content as cleaning avoidance information and control transmission of the cleaning avoidance information to the robot cleaner 200. The controller 270 of the robot cleaner 200 may then transmit response information 750 in response to reception of the cleaning avoidance information to the mobile terminal 600.

Figure 12:
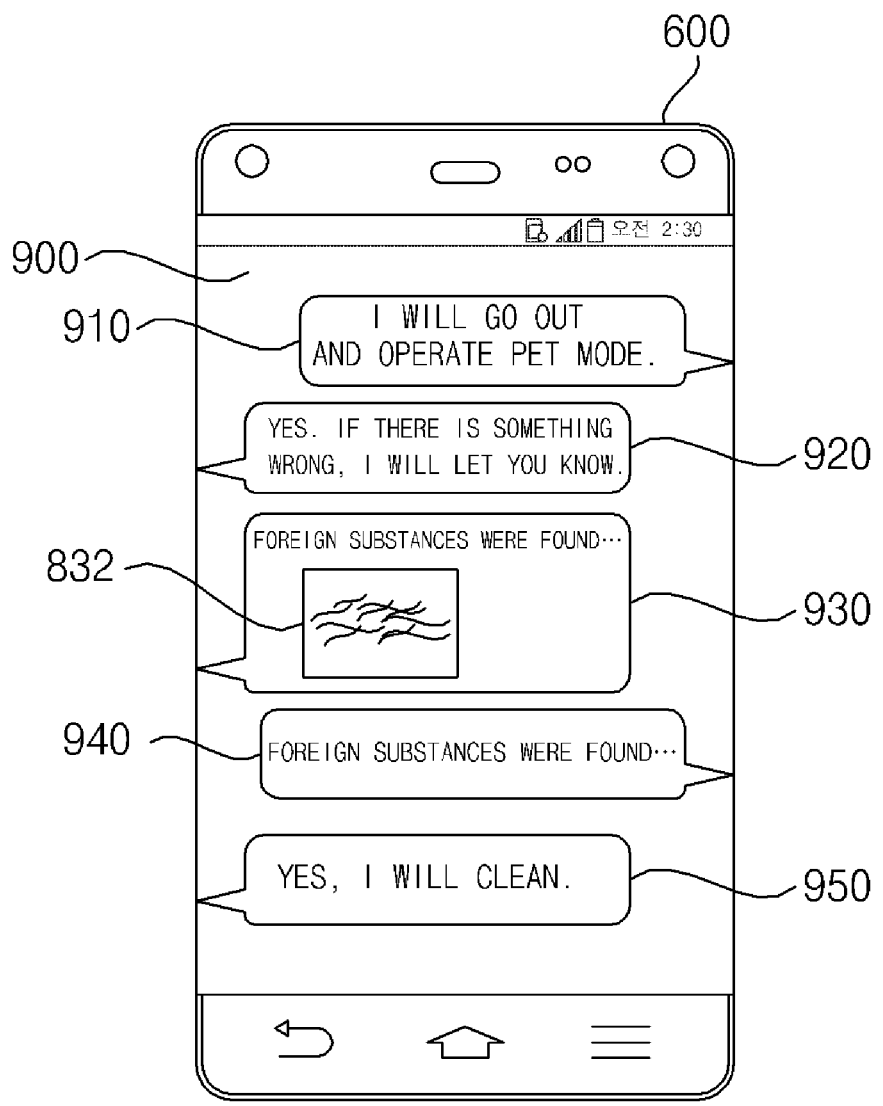
Figure 13A:
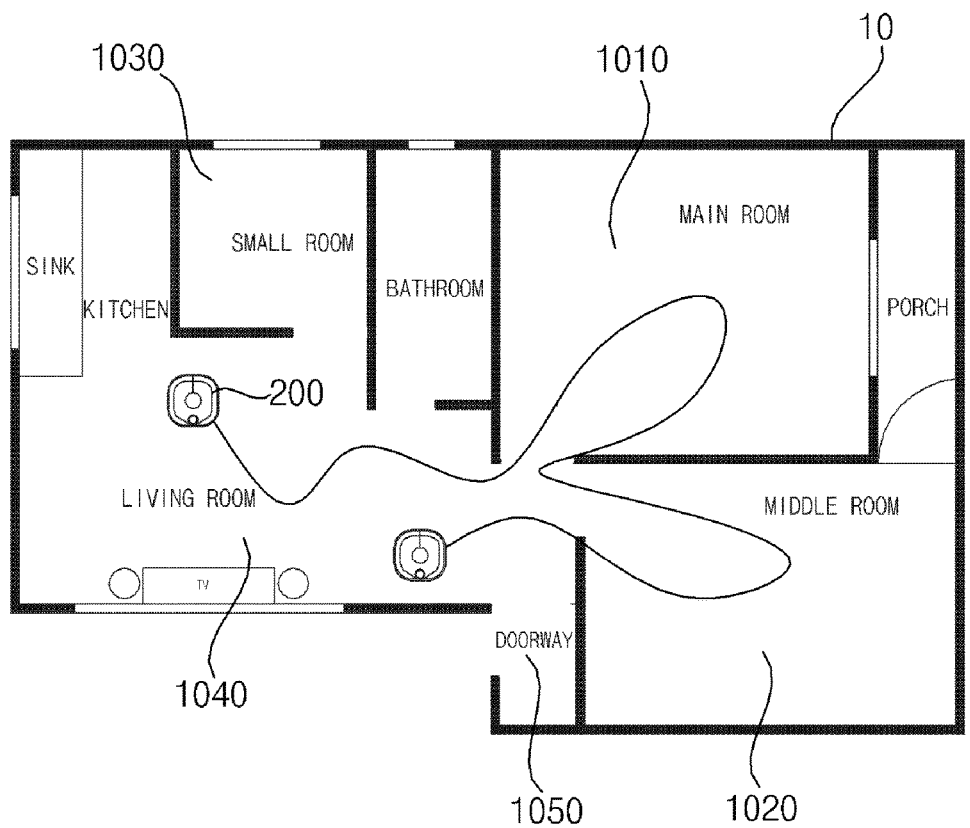
Figure 13B:
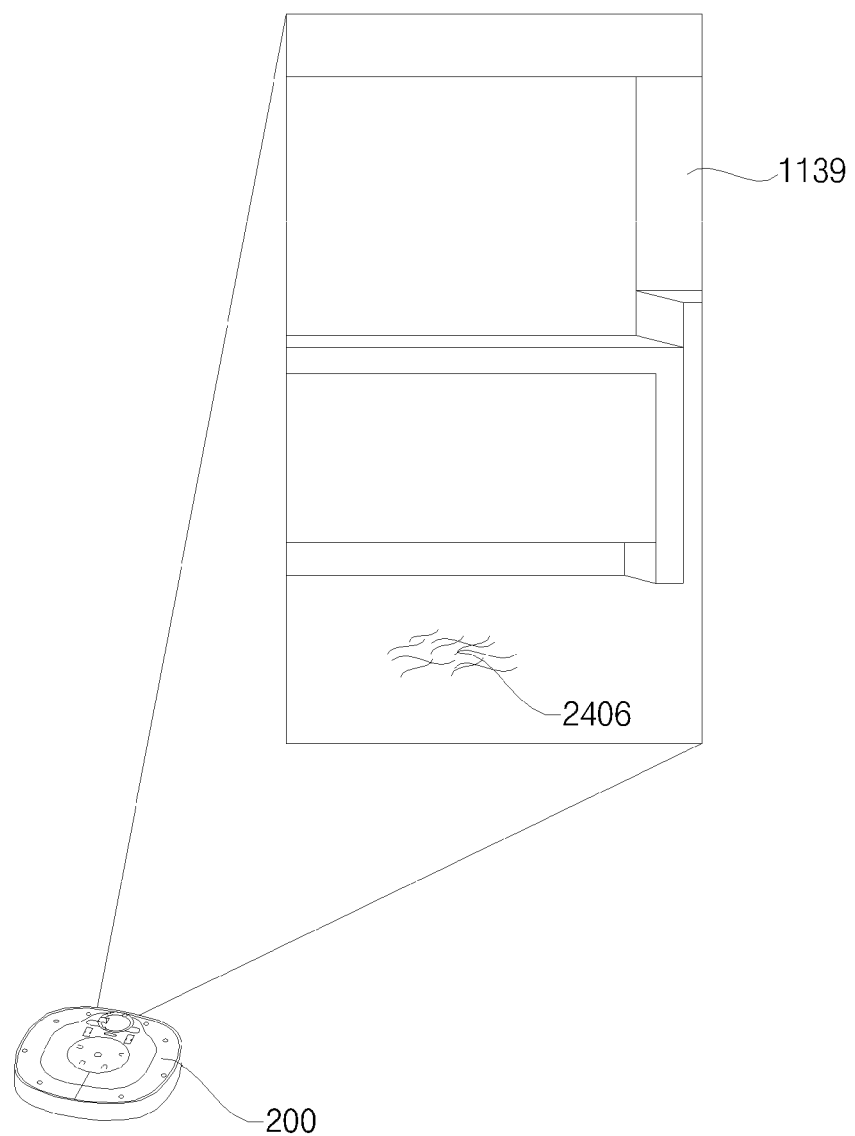
Figure 13C:
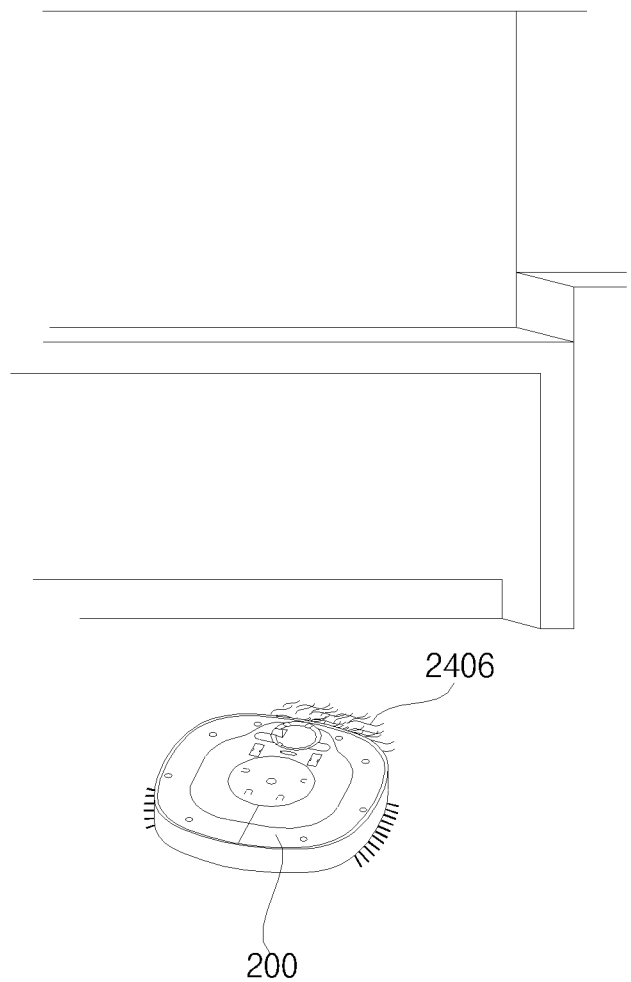
Figure 13D:
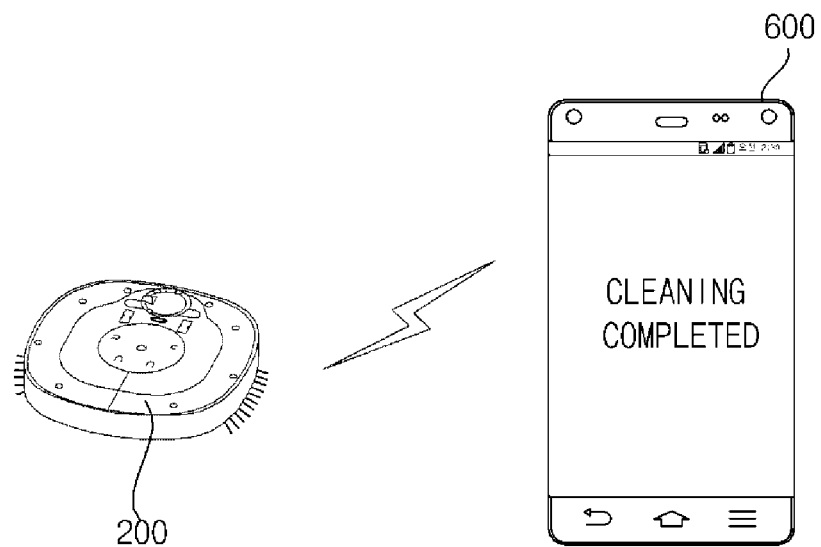

The controller 680 of the mobile terminal 600 may control display of the response information 750 corresponding to the cleaning avoidance information in the conversation window 700. Through the conversation contents in the conversation window 700, the user may instruct the robot cleaner 200 not to execute cleaning FIG. 12 exemplarily illustrates display of conversation contents related to cleaning execution information between the robot cleaner 200 and the mobile terminal 600, on the mobile terminal 600. With reference to FIG. 12, a conversation window 900 for exchange of data with the robot cleaner 200 may be displayed on the mobile terminal 600.

As shown, if text 910 related to a pet mode command is input by a user, the controller 680 of the mobile terminal 600 may analyze the text 910 and transmit the pet mode command to the robot cleaner 200. The controller 270 of the robot cleaner 200 may then receive the pet mode command and transmit a response message in response to the pet mode command to the mobile terminal 600, through the communication unit 222.

The controller 680 of the mobile terminal 600 may control display of text 920 corresponding to the response message in the conversation window 900. The controller 270 of the robot cleaner 200 may control execution of the pet mode. That is, the controller 270 of the robot cleaner 200 may control the traveling unit 280 so that the robot cleaner 200 travels about the home 10. Then, during traveling, the controller 270 of the robot cleaner 200 may control the camera 230 so as to capture images of about the home.

FIG. 13(*a*) exemplarily illustrates traveling of the robot cleaner 200 about the home 10. During such traveling, the camera 230 and/or sensor 18 may be activated and execute image capture. FIG. 13(*b*) exemplarily illustrates a middle room captured image 1139.

The controller 270 of the robot cleaner 200 may compare the captured image 1139 with an image pre-stored in the memory 243 and determine whether or not foreign substances are present based on a difference between the two images.

For example, the controller 270 of the robot cleaner 200 may detect hairs 2406 on the floor in the captured image 1139 and thus determine that foreign substances are present. Upon determining that foreign substances are present, the controller 270 may control transmission of the captured image 1139 including the hairs 2406 and related information to a predetermined user mobile terminal 600. If an image 832 including foreign substances in the home and related information 930 is received from the robot cleaner 200 during display of the conversation window 900 of FIG. 12, the controller 680 of the mobile terminal 600 may control display of the image 832 including foreign substances and the related information 930, as exemplarily shown in FIG. 12.

If a user inputs user conversation content such as "They may be cleaned" 940, the controller 680 of the mobile terminal 600 may determine this content as cleaning execution information (e.g., Yes) and control transmission of the cleaning execution information to the robot cleaner 200. The controller 270 of the robot cleaner 200 may then transmit response information 950 corresponding to the received cleaning execution information to the mobile terminal 600.

Further, the controller 270 of the robot cleaner 200 may control display of the response information 950 corresponding to the cleaning execution information in the conversation window 900. Further, the controller 270 of the robot cleaner 200 may control execution of the cleaning mode corresponding to the cleaning execution information.

FIG. 13(*c*) exemplarily illustrates that the robot cleaner 200 moves to an area near the hairs 2406 and the cleaning unit 245 is operated. Thereby, foreign substances may be removed. Through the conversation contents on the conversation window, the user may simply execute cleaning of foreign substances, such as hairs, which may be cleaned.

The controller 270 of the robot cleaner 200 may transmit cleaning completion information to the mobile terminal 600 after cleaning has been completed, as exemplarily shown in FIG. 13(*d*). Further, the controller 680 of the mobile terminal 600 may control display of the cleaning completion information, as exemplarily shown in FIG. 13(*d*).

The controller 270 of the robot cleaner 200 may control operation of the camera 230 during an automatic traveling mode or an automatic cleaning mode, separately from transmission of the image including foreign substances, compare a captured image in the home with an image pre-stored in the memory 243, and transmit the captured image and alarm information to the mobile terminal 600 if a difference between the two images is greater than or equal to a designated value.

Figure 14A:
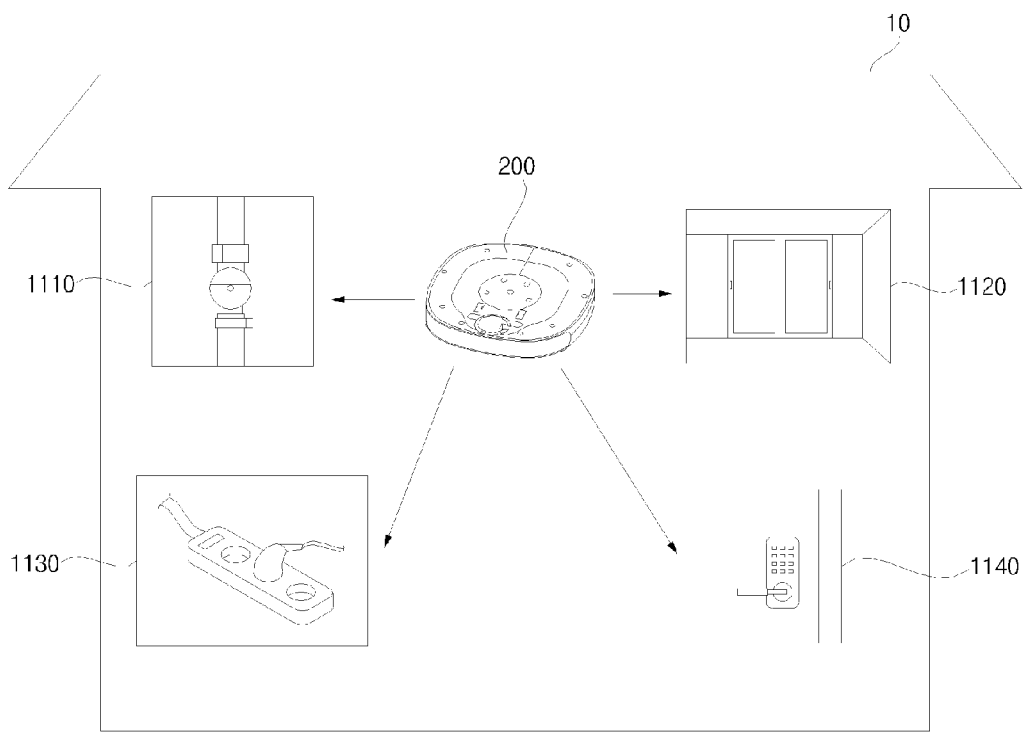
Figure 14B:
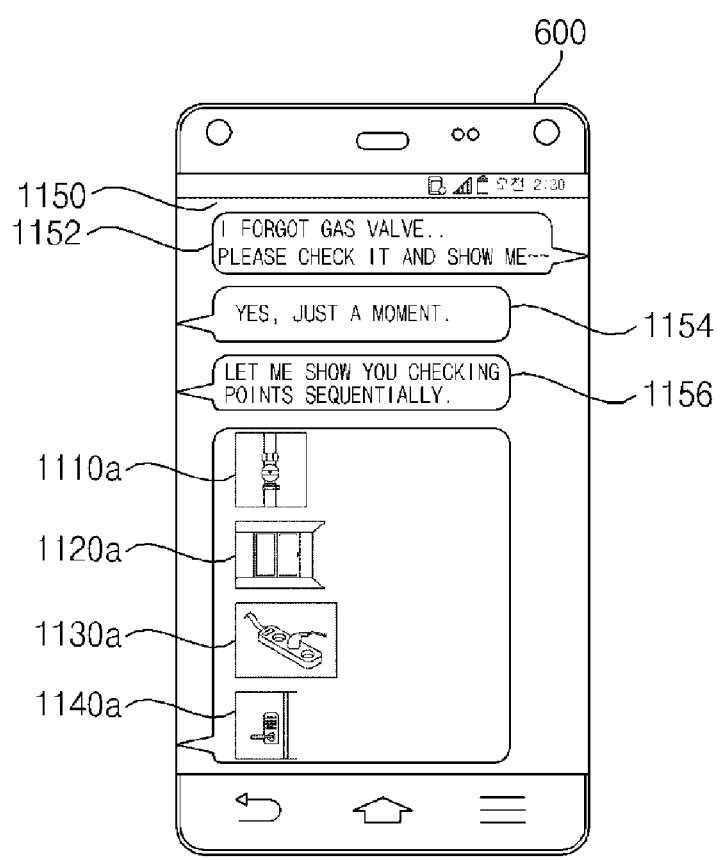

FIG. 14(*a*) illustrates various exemplary images captured by the robot cleaner 200. With reference to FIG. 14(*a*), the robot cleaner 200 may capture a gas valve pipe image 1110, a window image 1120, a consent image 1130, a door image 1140, and/or the like. For example, the controller 270 of the robot cleaner 200 may capture the gas valve pipe image 1110, the window image 1120, the consent image 1130, the door image 1140, and/or the like, during the automatic traveling mode or the automatic cleaning mode.

The controller 270 of the robot cleaner 200 may compare the gas valve pipe image 1110, the window image 1120, the consent image 1130, and the door image 1140 with pre-stored images, and transmit images having differences with the pre-stored images, which are greater than or equal to a designated value, and corresponding alarm information to the mobile terminal 600.

FIG. 14(*b*) exemplarily illustrates display of a conversation window on the mobile terminal 600. As shown in FIG. 14(*b*), if text 1152 related to a home checking mode command is input by a user, the controller 680 of the mobile terminal 600 may analyze the text 1152 and transmit the home checking mode command to the robot cleaner 200. The controller 270 of the robot cleaner 200 may then receive the home checking mode command and transmit a response message in response to the home checking mode command to the mobile terminal 600, through the communication unit 222.

The controller 680 of the mobile terminal 600 may control display of text 1154 corresponding to the response message in the conversation window 1150. The controller 270 of the robot cleaner 200 may control execution of the home checking mode. That is, the controller 270 of the robot cleaner 200 may control the traveling unit 280 so that the robot cleaner 200 travels about the home.

During traveling, the controller 270 of the robot cleaner 200 may then control the camera 230 so as to capture images of about the home. The controller 270 of the robot cleaner 200 may control transmission of captured images to the mobile terminal 600 without a comparison with pre-stored images. For example, the captured images may be the gas valve pipe image 1110, the window image 1120, the consent image 1130 the door image 1140 of FIG. 14(*a*).

FIG. 14(*b*) exemplarily illustrates that a checking point guide message 1156, a gas valve pipe image 1110*a*, a window image 1120*a*, a consent image 1130*a*, and a door image 1140*a* are displayed in the conversation window 1150. Thereby, a user may conveniently confirm images set as checking points in the home.

The controller 270 of the robot cleaner 200 may also receive weather information from the external server 500. The controller 270 of the robot cleaner 200 may control capture of the images set as the checking points in the home based on the weather information received from the server 500.

Figure 15A:
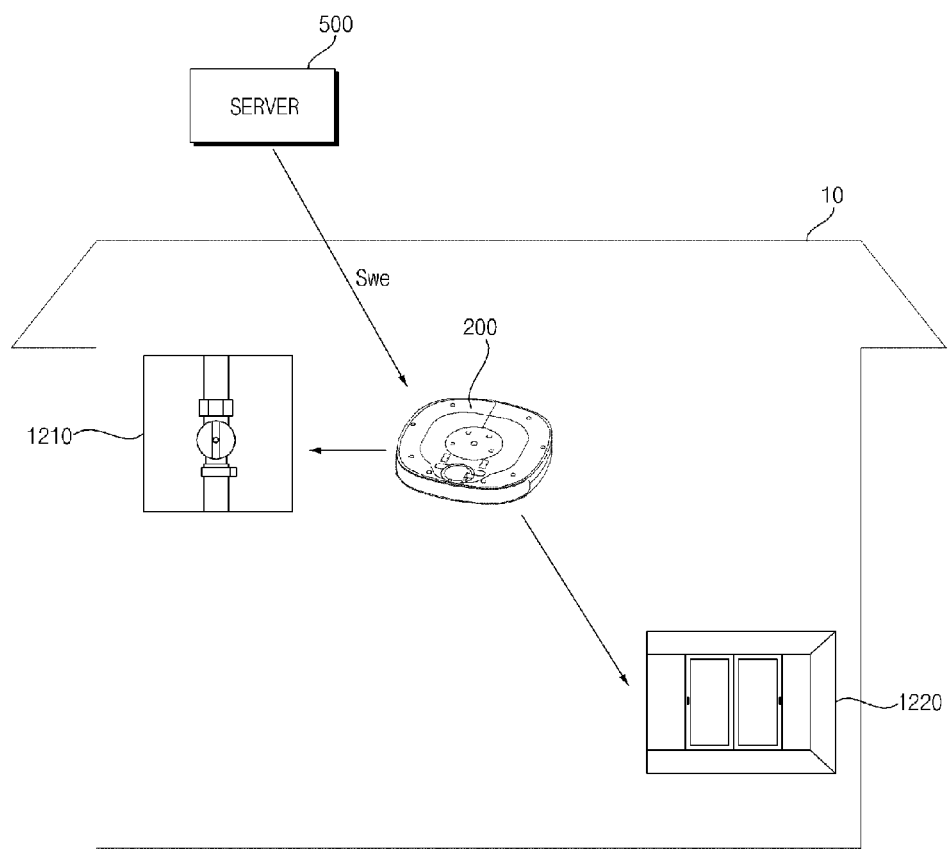

FIG. 15(a) exemplarily illustrates that the robot cleaner 200 receives weather information Swe from the server 500 and captures images of checking points in the home related to the weather information Swe. In more detail, a gas valve pipe image 1210, a window image 1220, and/or the like, may be captured. The controller 270 of the robot cleaner 200 may compare the captured images with pre-stored images and transmit the captured images and related information to the mobile terminal 600 if differences between the captured images and the pre-stored images are greater than or equal to a designated value.

For example, if a gas valve pipe in the gas valve pipe image 1210 is opened or a window in the window image 1220 is opened, the controller 270 of the robot cleaner 200 may compare the captured images with pre-stored images and transmit the gas valve pipe image 1210, the window image 1220 and related information to the mobile terminal 600 if differences between the captured images 1210 and 1220 and the pre-stored images are greater than or equal to a designated value.

Figure 15B:
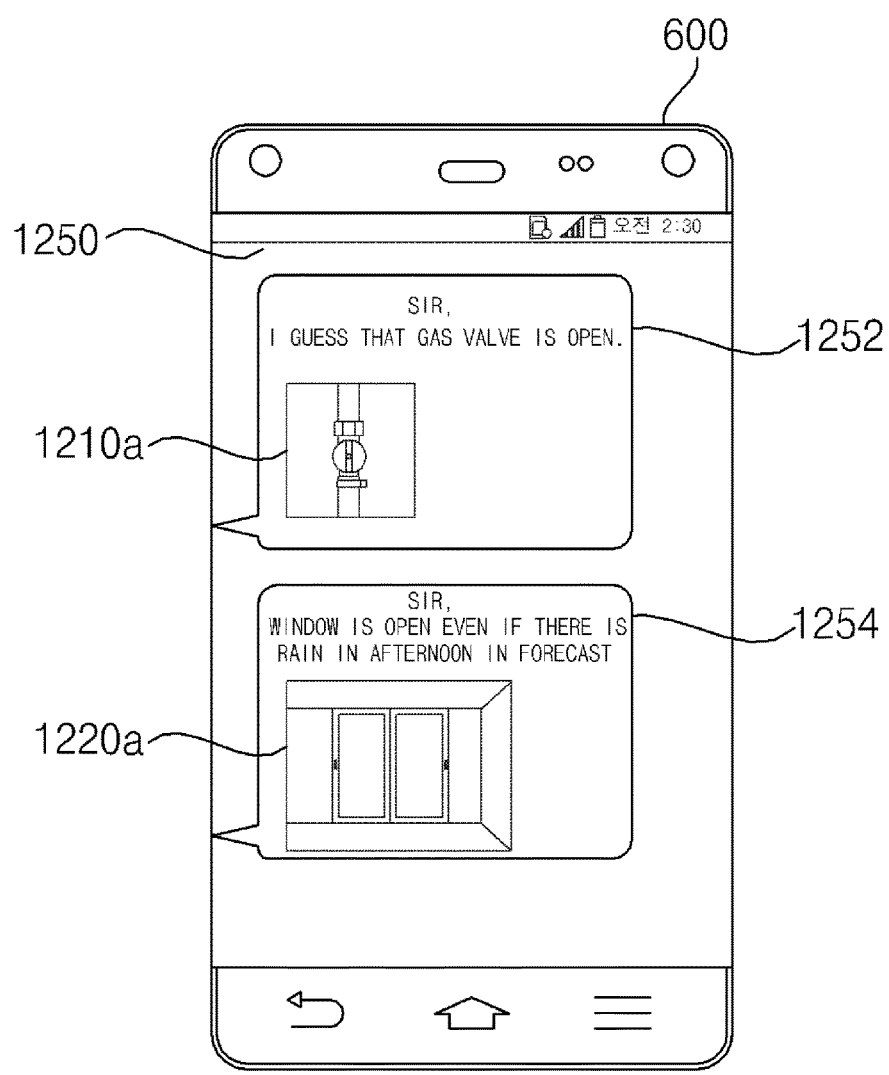

FIG. 15(b) exemplarily illustrates display of a conversation window on the mobile terminal 600. As shown, the controller 680 of the mobile terminal 600 may control display of gas valve opening information 1252 and a gas valve pipe image 1210a in a conversation window 1250 based on the gas valve pipe image 1210 and related information. Thereby, a user may simply recognize that a gas valve is opened.

Further, the controller 680 of the mobile terminal 600 may control display of window opening information 1254 and a window image 1220a in the conversation window 1250 based on the window image 1220 and related information. Thereby, the user may simply recognize that a window is opened.

The robot cleaner 200 may autonomously generate cleaning execution information or cleaning avoidance information by executing signal-processing of stereo images received from the stereo camera 230 based on computer vision. This will be described below with reference to FIG. 16, which is an exemplary inner block diagram of a controller of FIG. 4.

Figure 16:
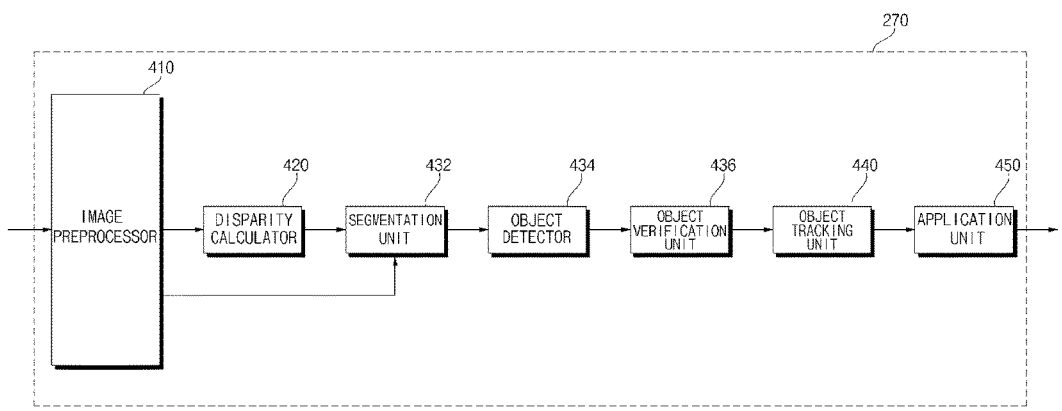
FIG. 16 is one exemplary inner block diagram of a controller of FIG. 4(b).

With reference to FIG. 16, the controller 270 may include an image preprocessor 410, a disparity calculator 420, a segmentation unit 432, an object detector 434, an object verification unit 436, an object tracking unit 440 and an application unit 450. The image preprocessor 410 may receive stereo images from the stereo camera 230 and execute preprocessing of the stereo images. In particular, the image preprocessor 410 may execute noise reduction, rectification, calibration, color enhancement, color space conversion (CSC), interpolation, camera gain control of stereo images. Thereby, the image preprocessor 410 may acquire clearer stereo images than stereo images captured by the stereo camera 230.

The disparity calculator 420 receives stereo images signal-processed by the image preprocessor 410, executes stereo matching of the received stereo images, and acquires a disparity map according to stereo matching. That is, the disparity calculator 420 may acquire disparity information of stereo images in front of the robot cleaner 200.

For example, stereo matching may be executed in the unit of pixels or the unit of designated blocks of stereo images. The disparity map may mean a map which numerically expresses binocular parallax information of stereo images, i.e., left and right images.

The segmentation unit 432 may execute segmentation and clustering of at least one of the stereo images based on disparity information from the disparity calculator 420. For example, the segmentation unit 432 may separate at least one of the stereo images into a background and a foreground based on disparity information.

According to a non-limiting example, the segmentation unit 432 may calculate a region having disparity information less than or equal to a designated value in the disparity map as a background and exclude the corresponding region. Thereby, a foreground may be separated.

According to another non-limiting example, the segmentation unit 432 may calculate a region having disparity information that is greater than or equal to a designated value in the disparity map as a foreground and extract the corresponding region. Thereby, the foreground may be separated.

The segmentation unit 432 may separate a background and a foreground from each other based on disparity information extracted based on stereo images, thus shortening a signal processing speed, a signal processing amount, and/or the like, when an object will be subsequently detected.

The object detector 434 may detect an object based on image segmentation from the segmentation unit 432. For example, the object detector 434 may detect an object from at least one of stereo images based on disparity information. In particular, the object detector 434 may detect an object from at least one of stereo images.

For instance, the object detector 434 may detect an object from a foreground separated through image segmentation. The object verification unit 436 may classify a separated object and verify the object. Accordingly, the object verification unit 436 may use an identification method using a neural network, a Support Vector Machine (SVM) method, an identification method by AdaBoost using Haar-Like features, and/or Histograms of Oriented Gradients (HOG) method.

The object verification unit 436 may verify a detected object by comparing the detected object with objects pre-stored in the memory 140. For example, the object verification unit 436 may verify a person, an animal, an object, and/or the like, located proximate the robot cleaner 200.

The object tracking unit 440 may execute tracking of a verified object. For example, an object in sequentially acquired stereo images may be verified, motion or a motion vector of the verified object may be calculated, and movement of the corresponding object may be tracked based on the calculated motion or motion vector. Thereby, the object tracking unit 440 may track a person, an animal, an object, and/or the like, located proximate the robot cleaner 200.

The application unit 450 may generate cleaning execution information and/or cleaning avoidance information regarding various objects located around the robot cleaner 200. The controller 270 of the robot cleaner 200 may execute a cleaning mode based on cleaning execution information generated within the controller 270 of FIG. 16. Further, the controller 270 of the robot cleaner 200 may not execute the cleaning mode based on cleaning avoidance information generated within the controller 270 of FIG. 16. A robot cleaner and a robot cleaning system having the same in accordance with the present disclosure are not limited to the above-described configurations and methods in accordance with the embodiments. All or some of these embodiments may be selectively combined so that various modifications are possible.

A method of operating a robot cleaner in accordance with the present disclosure may be implemented as code readable by a processor, provided in the robot cleaner, in a recording medium readable by the processor. The recording medium readable by the processor may be any kind of recording device in which data readable by the processor are stored. For example, the recording medium readable by the processor may include a ROM, a RAM, a CD-ROM, a magnetic tape, a floppy disk, and an optical data storage medium. Further, the medium readable by the processor may include a carrier wave, such as data transmission over the Internet. Further, since the recording medium readable by the processor may be distributed to computer systems connected through a network, code readable by the processor in a distributed manner may be stored and executed.

As apparent from the above description, a robot cleaner in accordance with one embodiment of the present disclosure includes a traveling unit configured to move a main body, a cleaning unit configured to execute cleaning, a camera configured to capture an image including foreign substances, a communication unit configured to exchange data with a mobile terminal or a server, and a controller configured to control transmission of the image including the foreign substances and image related information to the mobile terminal or the server and to execute cleaning of an area around the foreign substances based on cleaning execution information regarding the foreign substances or to execute no cleaning of the area around the foreign substances based on cleaning avoidance information regarding the foreign substances, transmitted from the mobile terminal or the server, thus selectively cleaning the foreign substances.

Particularly, the robot cleaner may receive cleaning command information including execution information or avoidance information regarding foreign substances from the mobile terminal or the server and thus selectively clean the foreign substances.

A robot cleaner in accordance with another embodiment of the present disclosure includes a traveling unit configured to move a main body, a cleaning unit configured to execute cleaning, a stereo camera configured to capture an image including foreign substances, a communication unit configured to exchange data with a mobile terminal or a server, and a controller configured to verify an object related to the foreign substances within the image by executing signal-processing of the image including the foreign substances, acquired from the camera, to generate cleaning execution information or cleaning avoidance information regarding the foreign substances based on the verified object related to the foreign substances, and to execute cleaning of an area around the foreign substances based on the cleaning execution information or to execute no cleaning of the area around the foreign substances based on the cleaning avoidance information, thus selectively cleaning the foreign substances.

Particularly, the robot cleaner may autonomously verify an object based on captured stereo images and generate cleaning execution information or cleaning avoidance information regarding foreign substances based on the verified object and thus selectively clean the foreign substances.

Although the embodiments of the present disclosure have been disclosed for illustrative purposes, those skilled in the art will appreciate that various modifications, additions and substitutions are possible, without departing from the scope of the disclosure as disclosed in the accompanying claims.

What is claimed is:

1. A robot cleaner comprising:
a main body;
a traveling device to move the main body;
a suction device including a suction fan provided within the main body to generate a suction force;
a camera for capturing an image of a foreign substance;
a communication device to exchange data with a mobile terminal or a server; and
a controller that controls the suction device to execute a cleaning operation based on a cleaning instruction received from the mobile terminal or the server,
wherein when a pet mode is set, the controller controls the traveling device, controls the camera during traveling, and acquires the image from the camera,
wherein when an image related to excrement in the pet mode is captured, the controller controls transmission of the image related to excrement and image related information to the mobile terminal or the server,
wherein when a pet mode is set, the controller controls the traveling device, controls the camera during traveling, and acquires the image from the camera,
wherein when an image related to excrement in the pet mode is captured, the controller controls transmission of the image related to excrement and image related information to the mobile terminal or the server,
wherein when cleaning execution information is received from the mobile terminal or the server, the controller controls the suction device to clean an area where the foreign substance including the excrement is located, and when the cleaning instruction comprises cleaning avoidance information, the controller controls the suction device to not clean the area where the foreign substance is located.

2. The robot cleaner of claim 1, wherein the controller controls transmission of a conversation-type message to the mobile terminal or the server.

3. The robot cleaner of claim 1, wherein the controller controls operation of the camera based on a foreign substance related image capture command received from the mobile terminal.

4. The robot cleaner of claim 1, wherein the controller controls the traveling device based on a foreign substance related image capture command received from the mobile terminal, controls the camera during traveling, and acquires the image from the camera.

5. The robot cleaner of claim 1, wherein the controller controls transmission of cleaning completion information to the mobile terminal, after completion of cleaning of the area where the foreign substance is located.

6. The robot cleaner of claim 1, wherein the controller controls transmission of response information corresponding to the cleaning avoidance information to the mobile terminal.

7. The robot cleaner of claim 1, wherein the controller controls operation of the camera based on an image capture command received from the mobile terminal, and controls transmission of an image captured by the camera to the mobile terminal.

8. The robot cleaner of claim 1, wherein the controller controls operation of the camera during an automatic traveling mode or an automatic cleaning mode, compares the image captured by the camera with an image stored in a memory, and controls transmission of the image and alert information to the mobile terminal when a difference between the two images is greater than or equal to a designated value.

9. A robot cleaner comprising:
a main body;
a traveling device to moves the main body;
a suction device including a suction fan provided within the main body to generate a suction force;
a stereo camera that captures an image of a foreign substance;
a communication device to exchange data with a mobile terminal or a server; and
a controller that executes signal processing of the image received from the camera, verifies an object related to the foreign substance within the image based on the signal-processing, and generates cleaning instructions regarding the foreign substance based on the verified object related to the foreign substance,
wherein when a pet mode is set, the controller controls the traveling device, controls the camera during traveling, and acquires the image from the camera,
wherein when an image related to excrement in the pet mode is captured, the controller controls transmission of the image related to excrement and image related information to the mobile terminal or the server,
wherein when the cleaning instruction comprises cleaning execution information, the controller controls the suction device to clean an area where the foreign substance including the excrement is located, and when the cleaning instruction comprises cleaning avoidance information, the controller controls the suction device to not clean an area where the foreign substance is located.

10. The robot cleaner of claim 9, wherein the controller comprises:
a disparity calculator that executes a disparity calculation of stereo images received from the stereo camera;
an object detector that detects an object from at least one of the stereo images based on disparity information of the stereo images; and
an object verification unit that classifies the detected object.

11. The robot cleaner of claim 9, wherein the controller controls transmission of cleaning completion information to the mobile terminal, after completion of cleaning of the area where the foreign substance is located.

12. The robot cleaner of claim 9, wherein the controller controls transmission of response information corresponding to the cleaning avoidance information to the mobile terminal.

13. A robot cleaning system comprising:
a robot cleaner that captures an image including a foreign substance, transmits the image including the foreign substances and image related information to a mobile terminal or a server, and executes a cleaning operation related to the foreign substance based on cleaning instructions received from the mobile terminal or the server; and
a mobile terminal that displays an image received from the robot cleaner and transmits the cleaning instructions to the robot cleaner based on the displayed image,
wherein when a pet mode is set, the robot cleaner travels and acquires the image during traveling,
wherein when an image related to excrement in the pet mode is captured, the robot cleaner transmits the image related to excrement and image related information to the mobile terminal or the server,
wherein the robot cleaner cleans an area where the foreign substance including the excrement is located when the cleaning instructions comprise cleaning execution information, and the robot cleaner does not clean the area where the foreign substance is located when the cleaning instructions comprise cleaning avoidance information.

14. The robot cleaning system of claim 13, wherein the robot cleaner transmits a conversation-type message to the mobile terminal or the server.

15. The robot cleaning system of claim 13, wherein the robot cleaner further comprises a traveling device that operates based on a foreign substance related image capture command transmitted to the robot cleaner from the mobile terminal, whereby the robot cleaner operates the camera during traveling and acquires the image including the foreign substance from the camera.

16. The robot cleaning system of claim 13, wherein the robot cleaner transmits cleaning completion information to the mobile terminal, after completion of cleaning of the area where the foreign substance is located.

17. The robot cleaning system of claim 13, wherein the robot cleaner operates the camera during an automatic traveling mode or an automatic cleaning mode, and transmits the image including the foreign substance and the image related information to the mobile terminal or the server when the image including the foreign substance is acquired from the camera.

* * * * *